United States Patent [19]
Graves

[11] Patent Number: 5,409,604
[45] Date of Patent: Apr. 25, 1995

[54] CLOSURE FOR A WASTEWATER TREATMENT MECHANISM

[75] Inventor: Jan D. Graves, Norwalk, Ohio

[73] Assignee: Norwalk Wastewater Equipment Company, Norwalk, Ohio

[21] Appl. No.: 232,317

[22] Filed: Apr. 25, 1994

Related U.S. Application Data

[60] Continuation of Ser. No. 52,731, Apr. 27, 1993, abandoned, which is a division of Ser. No. 806,743, Dec. 13, 1991, Pat. No. 5,264,120, which is a continuation-in-part of Ser. No. 477,389, Feb. 9, 1990, Pat. No. 5,207,896.

[51] Int. Cl.$^6$ .............................. C02F 1/00
[52] U.S. Cl. .................. 210/198.1; 210/109; 210/170; 210/172; 210/206; 210/207; 210/232; 210/244; 210/532.2; 422/264; 422/277
[58] Field of Search ............... 210/109, 163, 170, 172, 210/198.1, 205, 206, 207, 232, 244, 245, 246, 247, 519, 532.2; 422/264, 277

[56] References Cited

U.S. PATENT DOCUMENTS

| | | | |
|---|---|---|---|
| 681,477 | 8/1901 | Franke | 210/301 |
| 985,961 | 3/1911 | Ten Winkel | 210/311 |
| 1,123,011 | 12/1914 | Ripley | 210/199 |
| 1,290,820 | 1/1919 | Ten Winkel | 210/300 |
| 1,364,387 | 1/1921 | Landreth | 210/721 |
| 1,647,799 | 11/1927 | Hammer | 210/440 |
| 1,869,758 | 8/1932 | Lungstras | 210/521 |
| 2,129,181 | 9/1938 | Morse | 210/256 |
| 2,383,302 | 8/1945 | Feinauer et al. | 210/248 |
| 2,502,726 | 4/1950 | Horton | 210/415 |
| 2,837,212 | 6/1958 | Schmid | 210/247 |
| 2,878,935 | 3/1959 | Magrath et al. | 210/256 |
| 2,900,084 | 8/1959 | Zabel | 210/248 |
| 2,901,114 | 8/1959 | Smith et al. | 210/256 |
| 3,049,240 | 8/1962 | Smith | 210/315 |
| 3,118,834 | 1/1964 | Southworth et al. | 210/256 |
| 3,123,556 | 3/1964 | Gilbert | 210/256 |
| 3,214,021 | 10/1965 | Applebaum | 210/256 |
| 3,240,344 | 3/1966 | Hoelscher | 210/340 |
| 3,272,336 | 9/1966 | Humbert, Jr. | 210/311 |
| 3,332,552 | 7/1967 | Zabel | 210/532.2 |
| 3,378,858 | 4/1968 | Jacuzzi | 210/163 |
| 3,469,698 | 9/1969 | Blendermann | 210/163 |
| 3,483,984 | 4/1969 | Wolkenhauer | 210/311 |
| 3,495,711 | 2/1970 | Englesson | 210/256 |
| 3,529,723 | 9/1970 | Hagedorn | 210/163 |
| 3,595,786 | 7/1971 | Horvath et al. | 210/198.1 |

(List continued on next page.)

OTHER PUBLICATIONS

Zabel Industries, Inc. (Two sheets-Model A100).
Zabel Industries, Inc. Multi-Purpose Filters (four pages).
Zabel Industries, Inc. Multi-Purpose Filters (two pages).
Sanuril Models 1000/1001, Instruction Manual.
Sanuril Model 100/Mini San.

(List continued on next page.)

*Primary Examiner*—Robert A. Dawson
*Assistant Examiner*—Robert James Popovics
*Attorney, Agent, or Firm*—Diller, Ramik & Wight

[57] ABSTRACT

A wastewater treatment system includes inner and outer relatively telescopic units, the outer telescopic unit including an outer container having a bottom wall and a peripheral wall collectively defining a generally upwardly opening chamber, a filter exteriorly of the peripheral wall and defining therewith a first downstream settling zone, control openings in the peripheral wall for controlling wastewater flow through the first settling zone generally in response to the level of wastewater in the first settling zone, the inner telescopic unit including an inner container having a chamber defined in part by a peripheral wall, the peripheral walls being in relatively spaced relationship to each other and therebetween defining a second settling zone, a third settling zone within the inner telescopic unit chamber, and the inner and outer telescopic units each being a distinct unitized structure which permits the same to be bodily telescopically assembled and disassembled.

26 Claims, 13 Drawing Sheets

U.S. PATENT DOCUMENTS

| | | | |
|---|---|---|---|
| 3,630,370 | 12/1971 | Quina et al. | 210/532.2 |
| 3,709,364 | 1/1973 | Savage | 210/195.1 |
| 3,713,543 | 1/1973 | Heaney | 210/275 |
| 3,717,257 | 2/1973 | Boyle | 210/521 |
| 3,744,634 | 7/1973 | Schlenz | 210/256 |
| 3,769,207 | 10/1973 | Baer | 210/241 |
| 3,950,249 | 4/1976 | Eger et al. | 210/104 |
| 3,994,803 | 11/1976 | Neff et al. | 210/275 |
| 4,028,249 | 6/1977 | McGivern | 210/252 |
| 4,035,297 | 7/1977 | Aldridge et al. | 210/163 |
| 4,096,065 | 6/1978 | Bruch et al. | 210/205 |
| 4,117,560 | 10/1978 | Kidon | 210/195.3 |
| 4,505,813 | 3/1985 | Graves | 210/532.2 |
| 4,525,275 | 6/1985 | Ostlund | 210/342 |
| 4,608,157 | 8/1986 | Graves | 210/248 |
| 4,629,565 | 12/1986 | Hell et al. | 210/607 |
| 4,710,295 | 12/1987 | Zabel | 210/532.2 |
| 4,759,907 | 7/1988 | Kawolics et al. | 422/264 |
| 4,780,197 | 10/1988 | Schuman | 210/209 |
| 4,793,922 | 12/1988 | Morton | 210/317 |
| 4,806,241 | 2/1989 | Holien | 210/248 |
| 4,816,177 | 3/1989 | Nelson et al. | 210/750 |
| 4,933,076 | 6/1990 | Oshima et al. | 210/195.1 |
| 5,207,896 | 5/1993 | Graves | 210/109 |
| 5,264,120 | 11/1993 | Graves | 210/109 |

OTHER PUBLICATIONS

Sanuril Model 200/Mini–San.
Sanuril 115.
D–Chlor Tablets.
Jet Individual Home Sewage Treatment.
Sanuril Wastewater Chlorinator.
Aero–Modwastewater Treatment System.
Water and Wastewater Technology by Mark J. Hammer (1986), pp. 437–439.

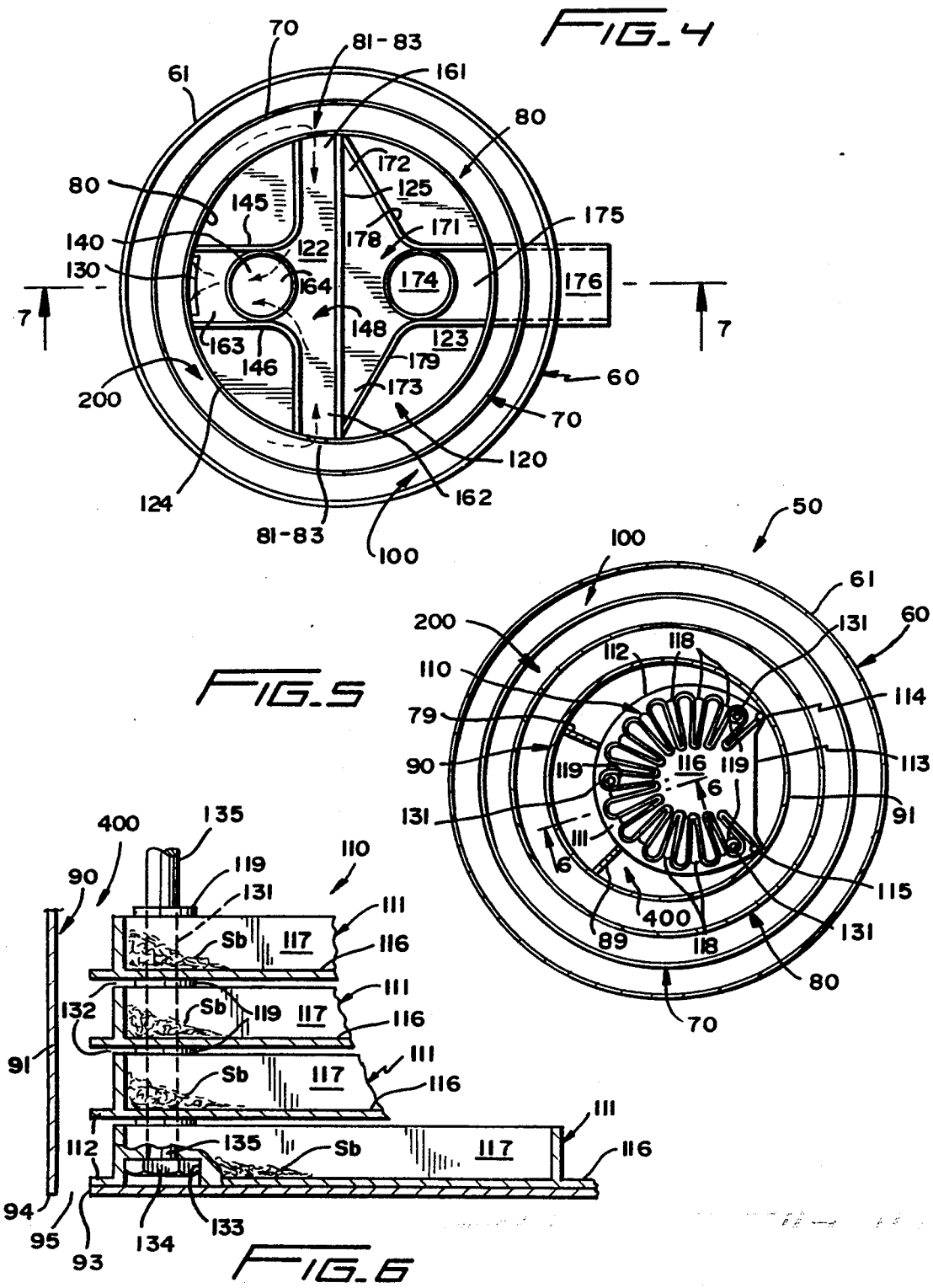

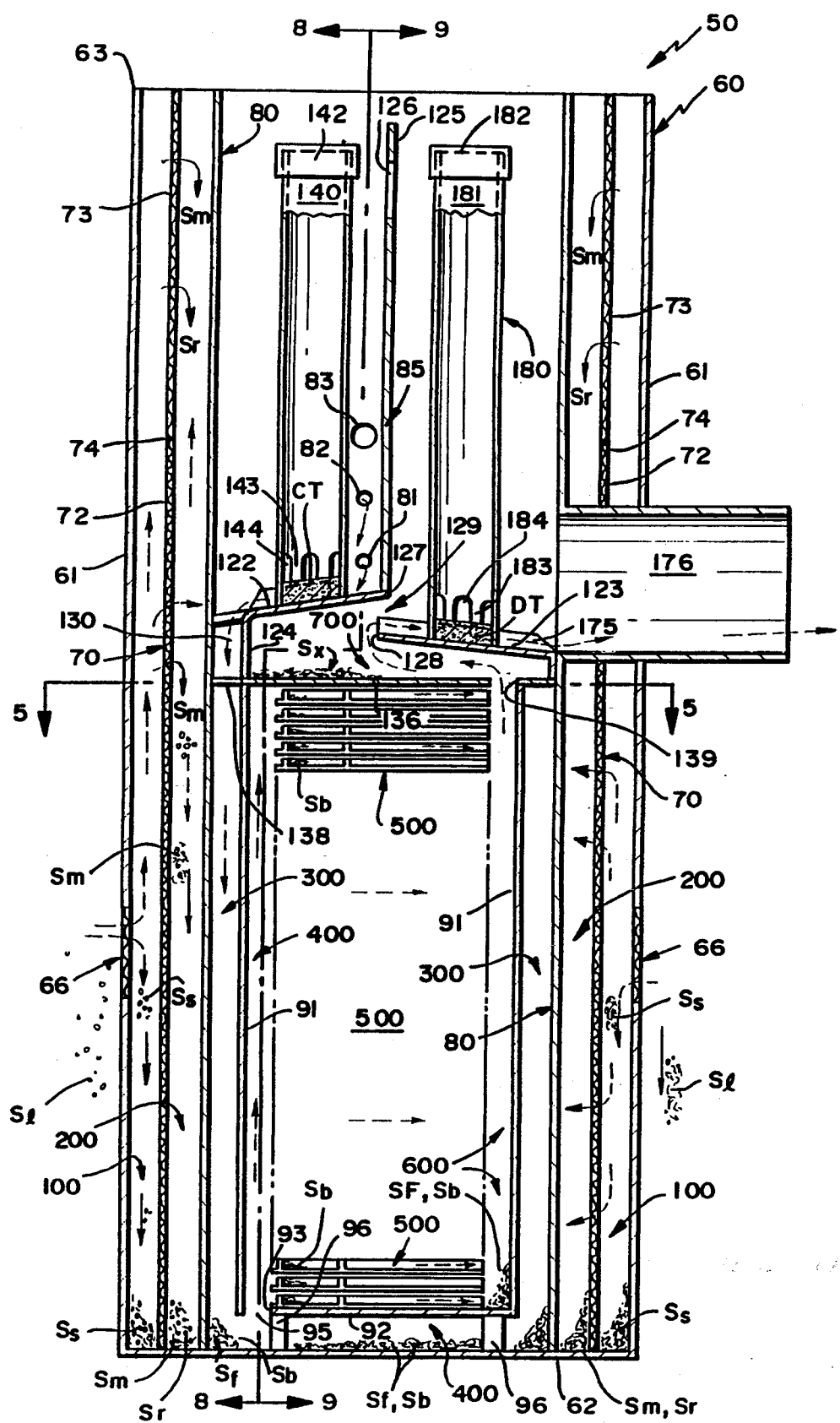

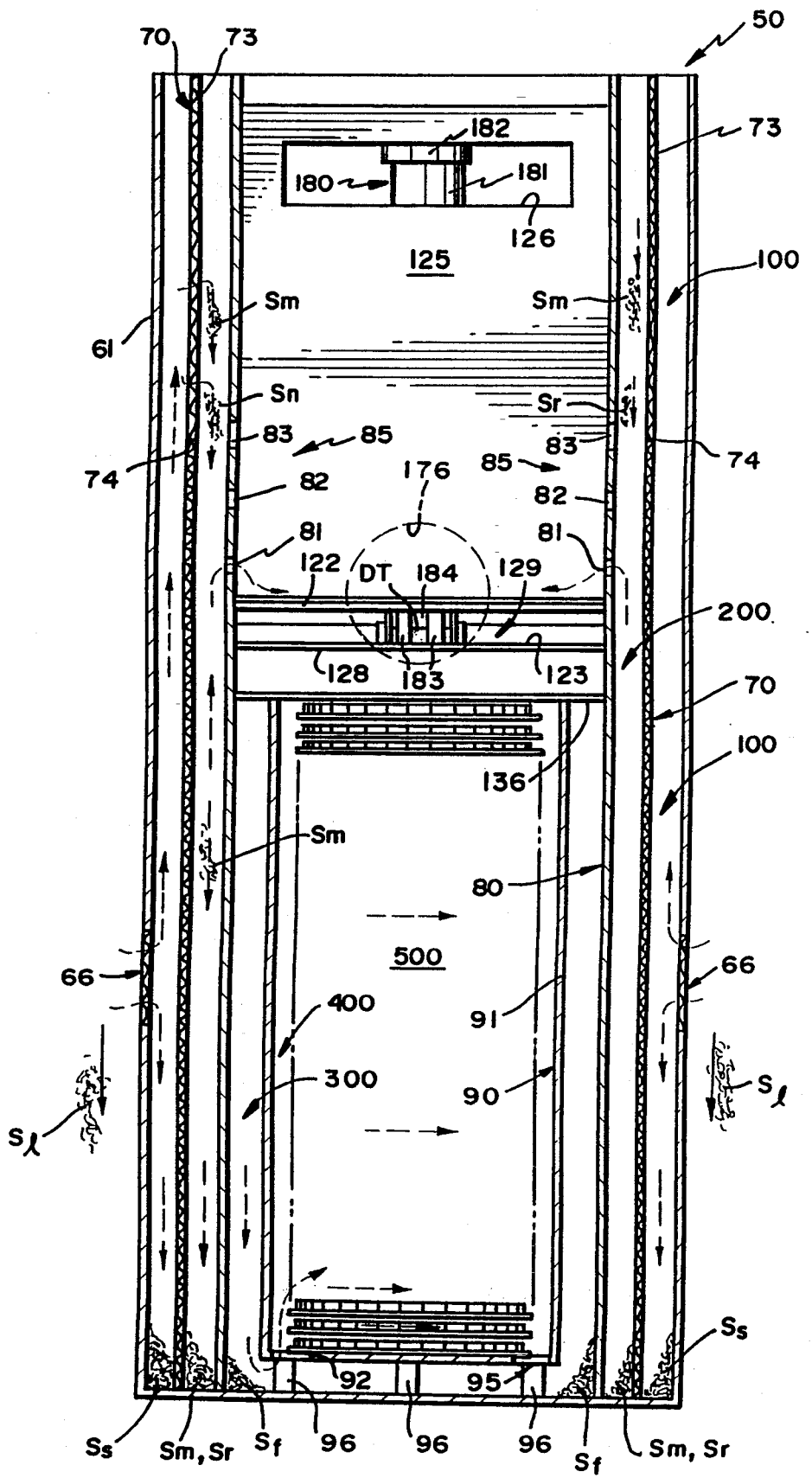
FIG_9

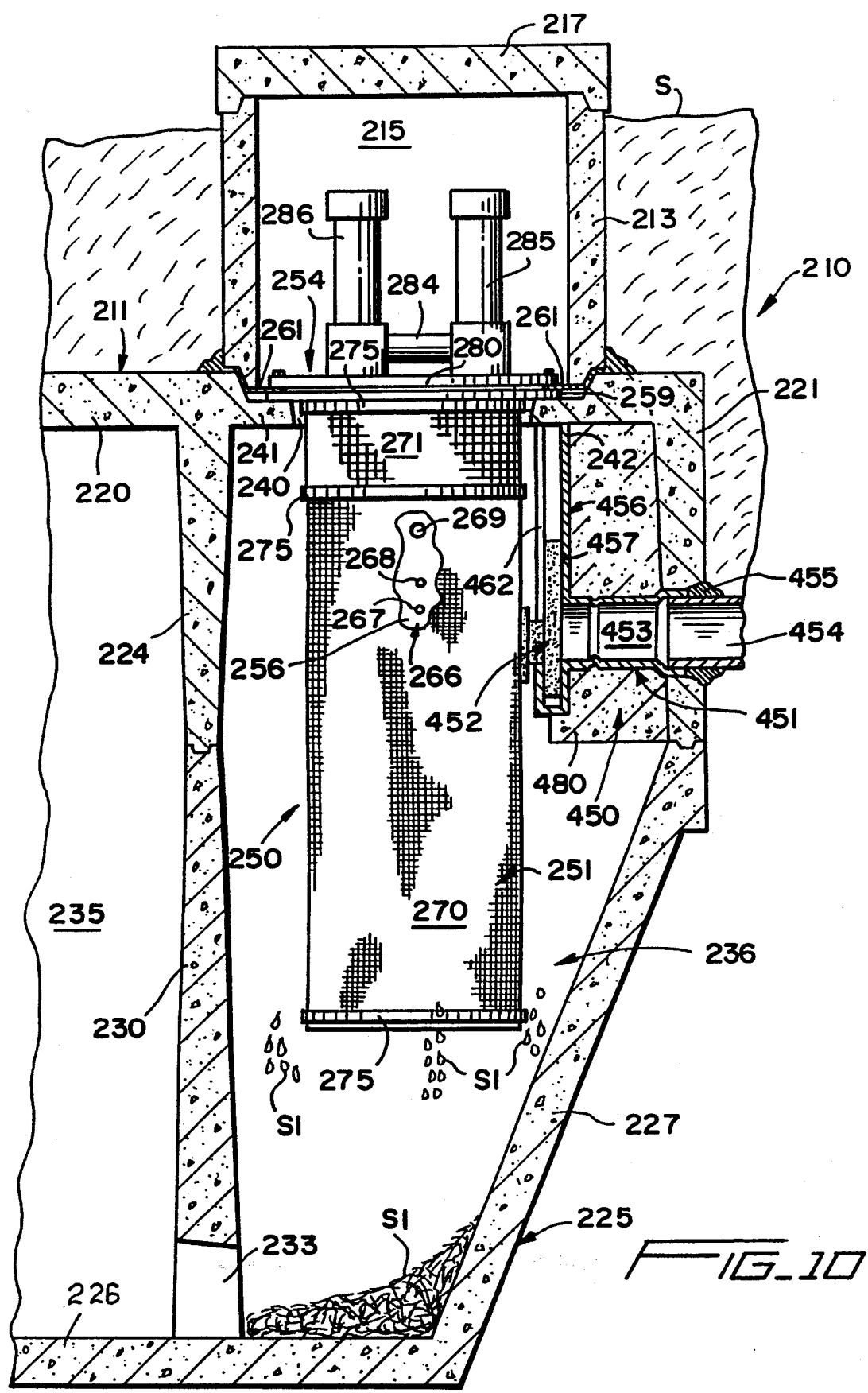
FIG_10

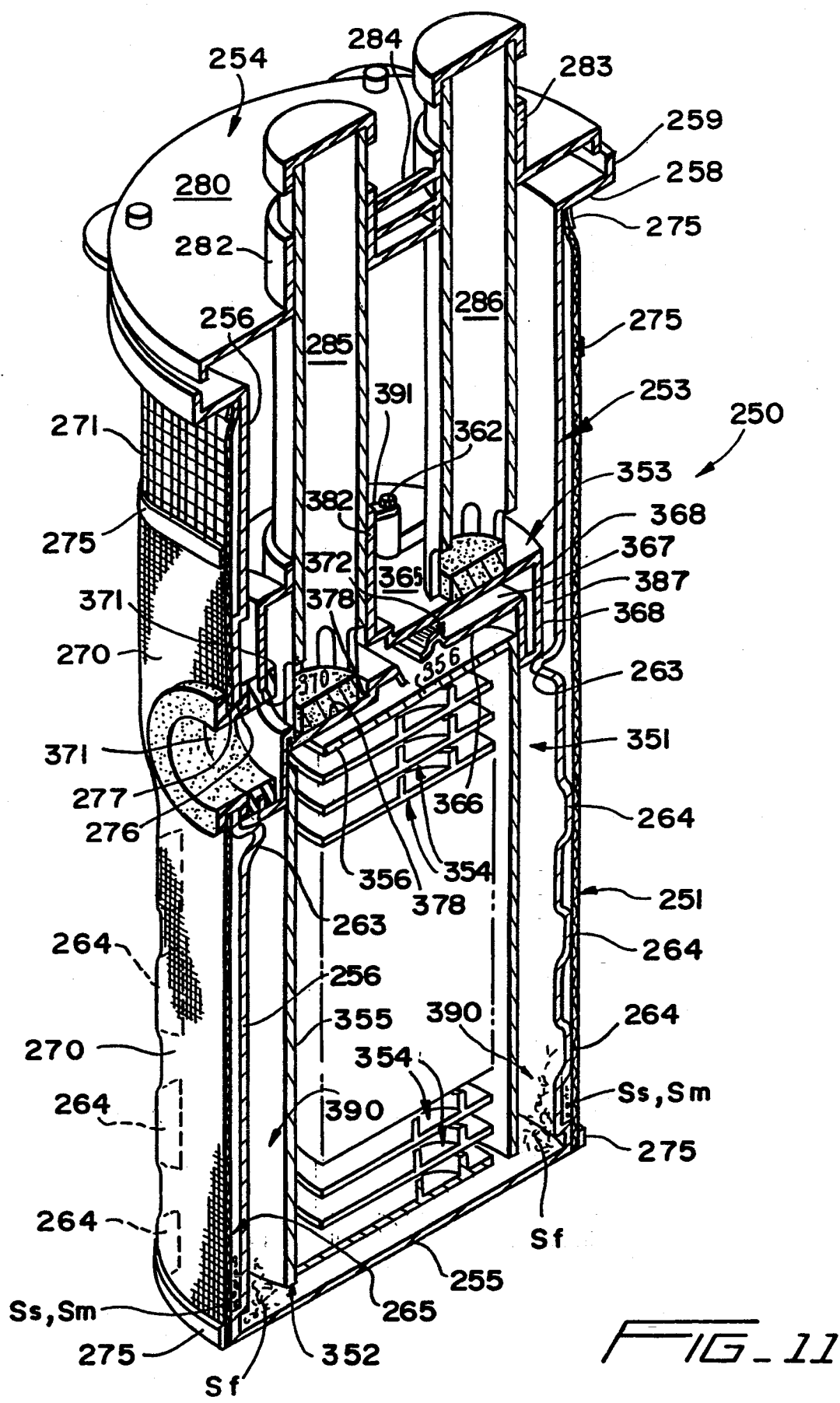
FIG_11

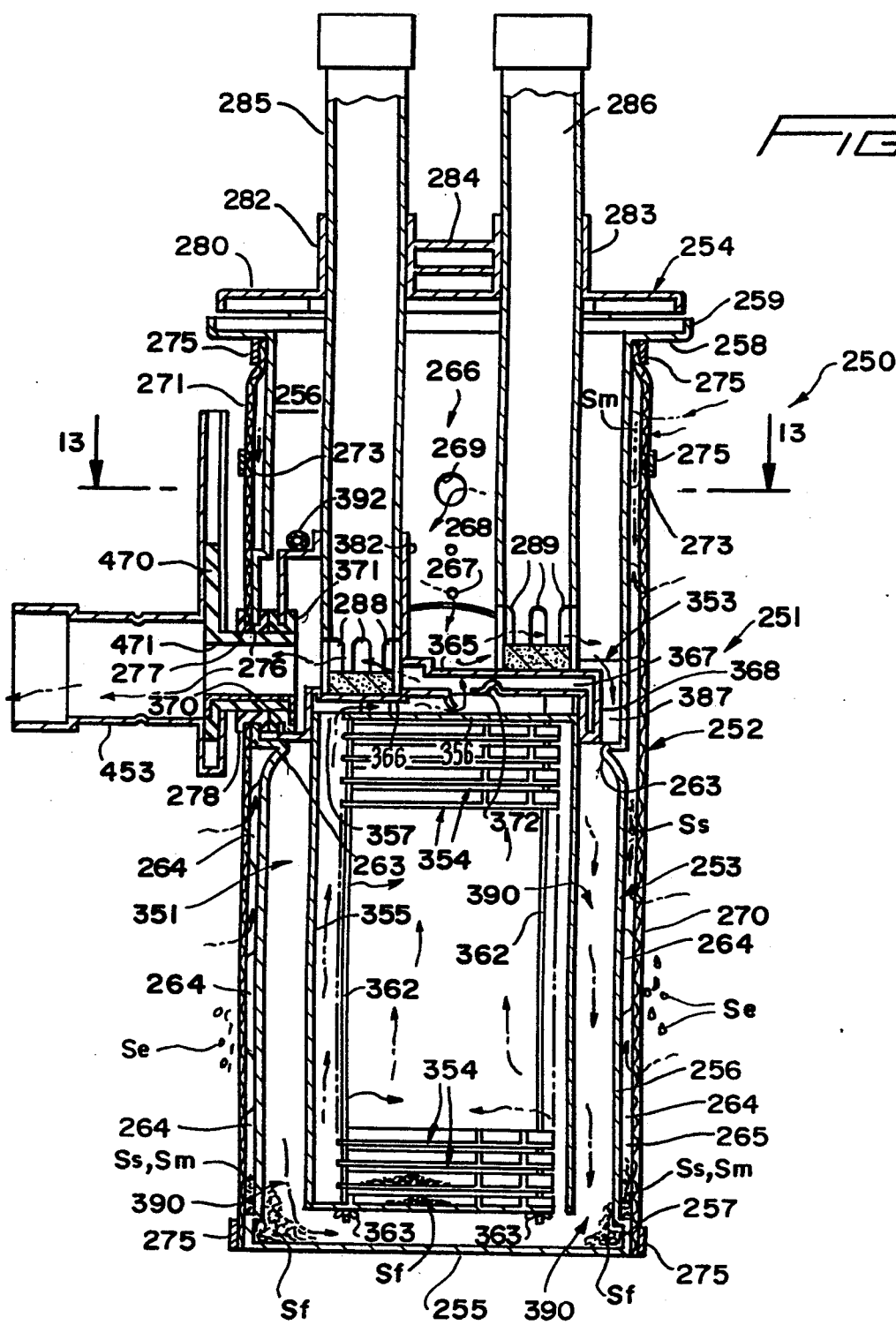
FIG_12

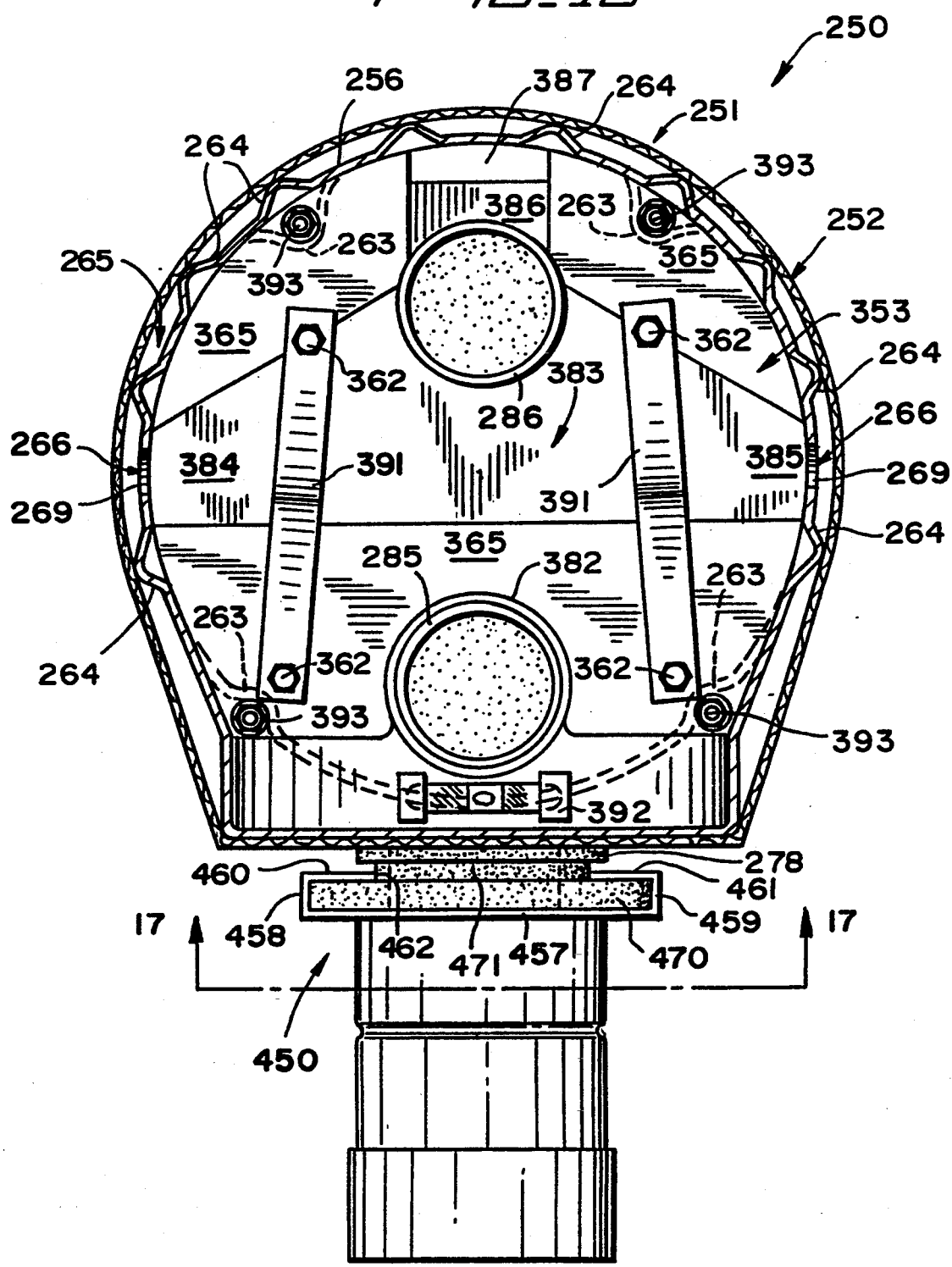

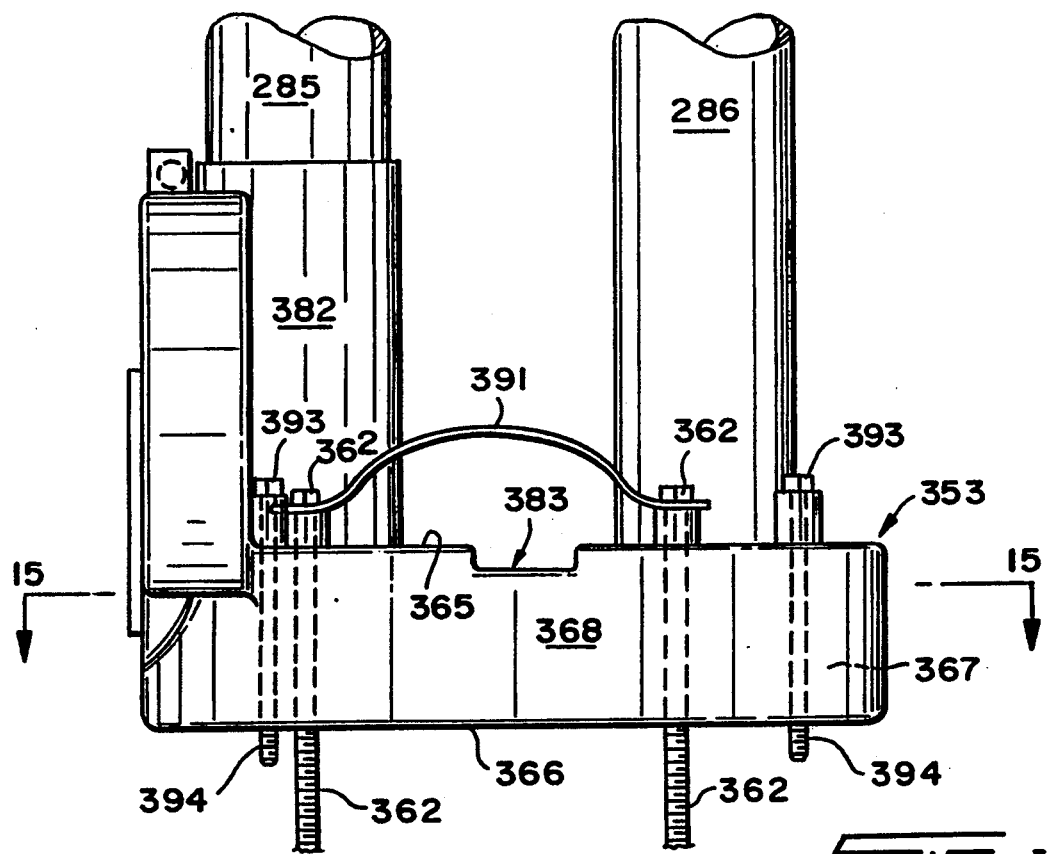
FIG._14
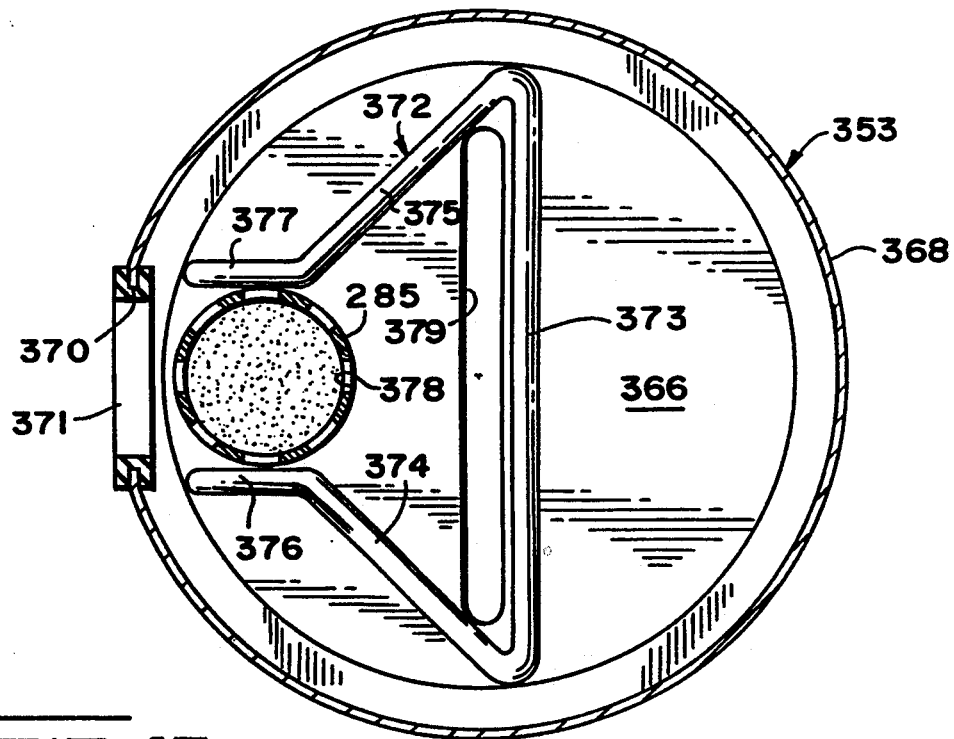
FIG._15

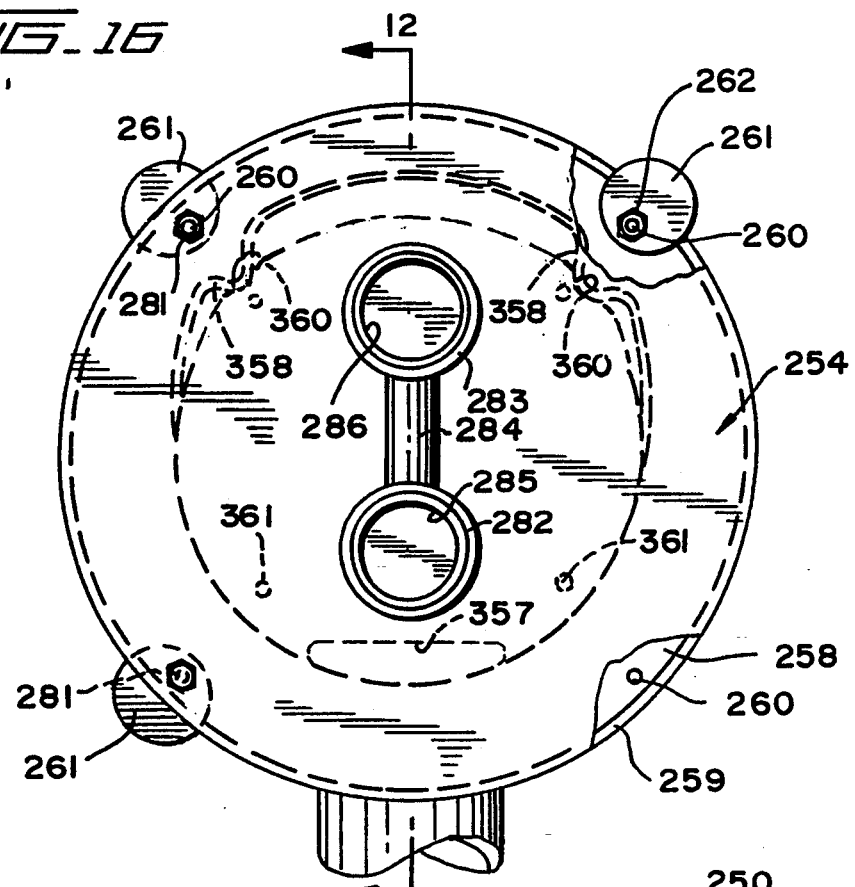
FIG_16
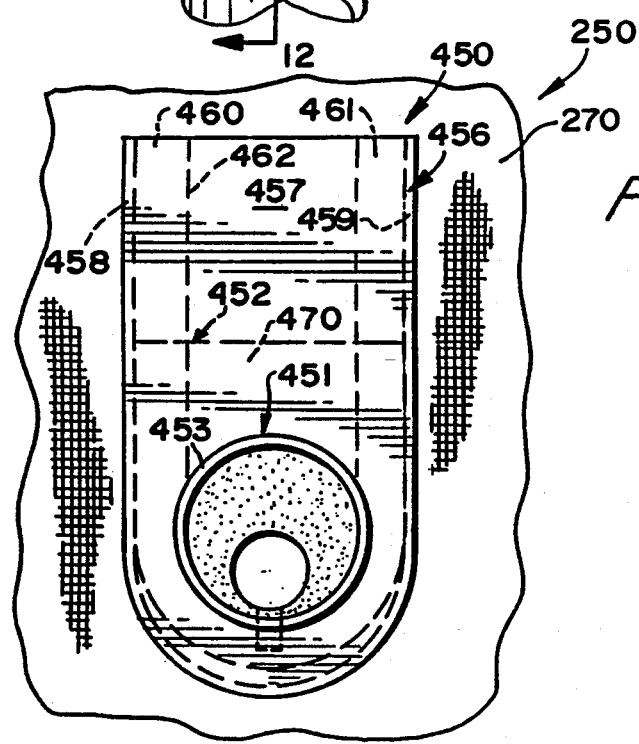
FIG_17

CLOSURE FOR A WASTEWATER TREATMENT MECHANISM

CROSS-REFERENCE TO RELATED APPLICATION

This application is a continuation of application number 08/052,731, filed Apr. 27, 1993, now abandoned, which is Rule 60 Div of 07/806,743 of Dec. 13, 1991, now U.S. Pat. No. 5,264,120 which is a CIP of 07/477,389 of Feb. 9, 1990, now U.S. Pat. No. 5,207,896.

BACKGROUND OF THE INVENTION

This invention is an improvement in wastewater treatment plants. Virtually all types of treatment processes including home aeration systems, septic tanks, commercial treatment systems and others experience periodic process upsets of varying load conditions that reduce efficiency.

This invention is designed to further enhance normal operations of all types of treatment processes and maintain efficiency even during process upsets or varying load conditions by utilizing flow equalization, filtration, disinfection and advanced treatment. This is accomplished in most cases by installation of the device within the treatment systems without the requirement for external separate appurtenances, tanks or complex electro-mechanical equipment.

This invention is illustrated by the use of a single unit in a typical home aeration system, but its use in other types of treatment systems, including multiple units installed in parallel arrangement in larger systems, is suitable.

SUMMARY OF THE INVENTION

The primary object of the present invention is to improve effluent quality. Coincidentally, disinfection of the process stream and optional dechlorination is accomplished internally of the device without remote mounted tanks and equipment. The following process description details how the device will function and how it improves operations of an aerobic home wastewater treatment system. The device will function similarly and will comparably improve operations in septic tanks, commercial aerobic systems and other types of treatment processes.

The innovative wastewater treatment mechanism effects filtration and settling of solids as they pass therethrough until the subsequent discharge thereof. The wastewater treatment mechanism includes an outermost wall having a primary filter formed from non-biodegradable inert synthetic material of relatively large mesh which prevents larger solids and particles, organic or otherwise, from entering the wastewater treatment mechanism from the clarification chamber. These larger solids settle to the bottom of the clarification chamber and never enter or affect the operation of the novel wastewater treatment mechanism. Those solids which pass through the primary filter enter a first settling chamber or settling zone where settling takes place before the wastewater is hydraulically displaced through another filter having a smaller pore size/mesh than the primary filter. Most of the remaining organic solids are trapped by this secondary filter, and these settle in the first settling zone or chamber, but those which pass through the secondary filter settle in a second downstream settling zone or chamber.

The second solids settling chamber is defined by an innermost peripheral wall which in turn includes at least one flow equalization port which assures proportional flow of the waste water through the wastewater treatment mechanism even under extremely high or high surge flow of the wastewater into the wastewater treatment system. As the level of the wastewater increases in the pretreatment, aeration and clarification chambers, as well as the two settling zones, the flow equalization opening or port assures relatively proportional flow through the wastewater treatment mechanism in response to the pressure head of the wastewater in the upstream chambers/zones.

The wastewater treatment mechanism further includes a chlorination zone downstream of the flow equalization opening(s)/port(s), and downstream of the latter is an unbaffled contact chamber or contact zone where smaller solids can still settle out and separation continues. Downstream of the contact chamber the wastewater flow is then hydraulically displaced upwardly into and through an inlet zone or chamber of a compartmented chlorine contact basin. The inlet chamber defines still another settling zone or chamber in which solids are further settled for the fourth time until passing onto baffled chamber plates of the chlorine contact basin where settling takes place for a fifth time. Wastewater solids/particles are settled during flow across the baffled chamber plates including inert binders of the chlorine tablets which after dissolving were not settled out in the unbaffled contact settling zone or the inlet settling zone.

The wastewater flow continues across the baffled chamber plates and into an effluent stilling chamber or zone where it is settled for yet another (sixth) time. From this zone the effluent is displaced upwardly into a final discharge/settling zone which is constructed to maximize settling, i.e., maximum surface area and shallow depth. Finally, the effluent is discharged from the wastewater treatment mechanism, but alternatively, dechlorination may take place incident thereto. Accordingly, the innovative wastewater treatment mechanism filters the waste water several times, equalizes flow, effects chlorination, settles solids and particles seven times and creates a stable, high-quality effluent.

The novel wastewater treatment mechanism of this invention provides numerous advantages, not only during the filtering/settling/chlorination and/or dechlorination processes thereof, but also in the overall wastewater treatment plant and the upstream pretreatment, aeration and clarification chambers.

For example, by placing of the device intrinsic to the process flow stream of the wastewater treatment system, the resultant buildup of upstream hydraulic head induced by the flow equalization port(s) integral to the mechanism, is shared by the entire wastewater treatment system. This allows maximum storage and metering of flow through the entire wastewater treatment system, as well as the new mechanism. The wastewater treatment system then enjoys all of the resultant operational benefits of an equalized process flow stream.

Another object of this invention is the demand use concept of the secondary filter. This filter is located vertically and extends both above and below the normal operating water level.

The changing liquid levels induced by the flow equalization port(s) cause higher levels of the secondary filter to be exposed to the process flow. At these higher levels solids accumulate upon the secondary filter, but these solids will be exposed above the liquid level when the incoming flow stops and the system "rests." This accumulation of solids and sludge at the higher stage of operation will no longer be in the wastewater and thus will advantageously dehydrate, experience a reduction in volume, and also become biologically inactive. Upon a subsequent high level increase, the accumulated dehydrated sludge will be "washed" from the screen, solids will settle out, and the secondary filter will thus be effectively self-cleaned.

A third or tertiary filter/screen is also provided of a size/mesh between the primary and secondary filters. This tertiary filter is located above the secondary filter and extends above the normal operating wastewater level., and due to this location and construction the tertiary filter provides the following operational characteristics and advantages:

(a) Since the tertiary filter is constructed from the same inert synthetic non-biodegradable material as the primary and secondary filters, the advantages of each is also attributed to the secondary filter, and these are incorporated hereat merely by reference.

(b) Since the tertiary filter has a size between the primary and secondary filters, at high liquid levels the tertiary filter removes the largest amount of sludge and solids from the flow stream which have passed through the primary filter yet will pass therethrough solids which might not otherwise pass through the secondary filter yet which will subsequently settle out downstream of the secondary filter. In this fashion maximum filtering efficiency is achieved by the secondary and tertiary filters between maximum low and maximum high liquid level flow through the wastewater treatment mechanism.

(c) After prolonged use the accumulation of solids of the upstream side of the secondary filter could cause plugging there of with attendant rise in the liquid level until the tertiary filter provides process filtration on a demand flow basis. The coarser tertiary filter would pass a high percentage of solids, but would still provide some solids removal as well as protection for downstream processes. Hence, under this first set of circumstances (secondary filter stoppage) the tertiary filter still provides advantageous filtering and protection to downstream processing.

(d) The second set of circumstances which cause the tertiary filter to function would be in the event of an incoming flow rate that would cause the upstream head of water induced by the flow equalization ports to raise until the normal operating liquid level in the first settling zone would be at the same location as the tertiary filter. In this case both the secondary and tertiary filters would be fully operative and though a higher percentage of solids would be passed, this percentage would be lower than if the secondary filter were plugged. Thus in this case the system is advantageously more efficient than when the secondary filter is plugged.

The novel wastewater mechanism also includes in a downstream wall of the second solids settling zone or chamber one or more flow equalization ports or openings which are preferably arranged in diametrically opposite pairs which build up a static head of the wastewater on the upstream side when the incoming wastewater flow rate exceeds the ability of the ports to pass the wastewater at the given static head. The ,operational characteristics and advantages of the flow equalization ports include:

(a) The elevation of the lowest pair of diametrically opposite flow equalization ports determines the normal operating wastewater level of the entire wastewater plant from the pretreatment chamber downstream.

(b) A second pair of equalization ports located approximately 3½" above the first equalization ports come into play as the induced upstream static head continues to increase as liquid level rises upstream. The higher the hydraulic head the greater the pressure and therefore the more water which will proportionately flow out of the lower pair of equalization ports until the upper pair of equalization ports come into operation. In this manner the demand rate flow is achieved at minimum wastewater level fluctuation and minimum hydraulic currents.

(c) Should prolonged and excessive incoming wastewater flow exceed the ability of both levels of flow equalization ports to pass the wastewater, a pair of large size equalization ports or override ports become effective to pass the remaining flow. This not only assures efficient operation but permits such flow should any of the lower and smaller equalization ports become clogged for any reason.

A further component of the innovative wastewater treatment mechanism is a dry tablet chlorinator mounted directly downstream of the flow equalization ports and upstream of still further filters. The dry tablet chlorinator includes the following operational characteristics and advantages:

(a) The dry tablet chlorinator has a lower end positioned along an inclined channel along which wastewater flows after exiting the flow equalization ports. Since the wastewater flows past the tablets, the tablets are not immersed in water and this prevents tablet "bridging" and jamming thereof in the feed tube which in turn assures effective chlorination irrespective of the wastewater flow rate.

(b) The upstream settling/filtering prevents large organic and solid material from even reaching the chlorination area and therefore undesired accumulation on the tablet feed tube and in the general chlorinator area is precluded.

(c) The controlled flow by the equalization ports allows for an extremely efficient controlled rate of application of chlorine and eliminates wide ranging application rates.

(d) The dry tablet chlorinator is so located in an associated contact chamber as to preclude or at the worst minimize transmigration of chlorine upstream by being isolated therefrom except for the flow equalization ports heretofore described.

The novel and innovative wastewater treatment mechanism also includes within the contact chamber an unbaffled contact zone which achieves chlorination after the wastewater has been filtered at least twice, settled twice, flow equalized and chlorinated. The unbaffled contact zone of the contact chamber effects initial contact of the applied chlorine and solids and also achieves settling of solids in a third settling zone or chamber with the following operational characteristics and advantages:

(a) Because of the position of the equalization ports in an uppermost position relative to the contact zone or chamber, general downward movement of the wastewater flow enhances particles/solids separation to achieve maximum settling and the same downward flow carries the chlorinated liquid to the bottom of the contact chamber for maximum contact of the chlorine and accumulated settled solids.

(b) The chlorine contact zone/chamber also has a relatively large peripheral extent which allows the chlorinated liquid to flow peripherally and contact solids which settle virtually anywhere within the contact chamber.

The novel and innovative wastewater treatment mechanism further includes a baffled settling zone or chamber downstream of the chlorination chamber for further processing the hydraulic flow and settling the few remaining solids under the following operational characteristics and advantages:

(a) The baffled settling zone or chamber includes a plurality of horizontally arranged and vertically stacked baffle plates which proportionately divide the flow into generally parallel horizontal paths which achieves maximum settling of any remaining solids, particularly the inert binders of the chlorine tablets.

(b) The presence of chlorine surrounding and within the baffled settling chamber prohibits biological activity from increasing the solids population on each of the horizontal baffles and prevents plugging of the relatively small slit or opening (1/16") between adjacent baffle plates.

(c) Once solids are settled on the downstream side of a weir associated with each baffle, maximum compaction of the solids results in maximum sludge density because of the lack of side processes or devices to harvest or return solids to another process. Furthermore, upstream chemical stabilization of the solids by chlorination allows maximum compaction to take place as further biological activity of the solids is inhibited.

The innovative wastewater treatment mechanism further includes an effluent stilling well, zone or chamber downstream of the baffle settling chamber into which the liquid is hydraulically displaced and which has the following operational characteristics and advantages:

(a) Retention of the liquid in the effluent stilling chamber allows gravity settling of any particulates/solids and colloidal material in the flow stream as well as any particulates that may have been scoured from the baffle plates.

(b) Gravity settling of the particulates/solids within this stilling chamber is also enhanced by the controlled hydraulic flow rate induced by the upstream flow equalization ports mentioned earlier herein.

(c) Obviously maximum compaction of accumulated solids takes place in the bottom of the effluent stilling chamber with attendant maximum compaction due to chemical stabilization of the sludge as a result of the upstream chlorination.

The mechanism further includes a discharge chamber or zone downstream of the effluent stilling chamber which includes the following operational characteristics and advantages:

(a) The discharge chamber defines a quiescent area which also promotes gravity settling of solids before final discharge.

(b) The discharge zone is geometrically designed with a large ratio of surface area to depth for maximum solids separation and settling, and once settled there are no hydraulic currents to return solids to the process stream thereby resulting in final maximum settling and compaction of the stored solids before liquid discharge.

The wastewater treatment mechanism includes as a final component an optional dechlorination zone defined by a dechlorination tablet feed tube for removing all traces of chlorine residual from the flowstream which includes the following operational characteristics and advantages:

(a) If dechlorination is not required by local regulation/ordinance, the dechlorination zone or feed tube can be omitted without in any way disturbing the earlier described process functions.

(b) The dechlorination is achieved just as chlorination is achieved, thus preventing the "bridging" and jamming heretofore described.

(c) Obviously the controlled flow rate by the upstream flow equalization ports allows for controlled rate application of dechlorination chemicals and eliminates wide ranging application rates.

In further accordance with the present invention, a novel wastewater treatment mechanism includes essentially two distinct unitized structures, namely, inner and outer relatively telescopic units of which the outer telescopic unit includes an outer container defined by a bottom wall and a peripheral wall collectively forming an upwardly opening chamber. Filter means exteriorly surround the peripheral wall and ,collectively define therewith a first downstream settling zone. Control means in the form of at least one hole is provided in the peripheral wall for controlling wastewater flow through the first settling zone generally in response to the level of wastewater in the first sealing zone. The inner telescopic unit also includes a chamber defined by an inner container having a peripheral wall which with the outer container peripheral wall defines a second settling zone therebetween. The inner telescopic unit chamber includes means defining a third settling zone. Means are provided for unitizing the outer container and filter means of the outer telescopic unit and means are also provided for unitizing the third settling zone defining means and the inner container. The two units can thereby be readily assembled and disassembled for inspection and/or repair by appropriate relative telescopic movement therebetween.

In further accordance with the latter object, the novel wastewater treatment mechanism also includes a separate top wall or cap which is secured by unitizing means to the inner container peripheral wall. The top wall or cap is generally of a hollow construction and includes an opening for conducting wastewater from the inner container chamber outwardly thereof, another opening for discharging the wastewater from the hollow cap, and an upper surface of the cap having a trough of a configuration which merges two converging wastewater streams into a single merged stream whose flow is in a radially outward direction.

Still another object of this invention is to provide a novel wastewater treatment mechanism as aforesaid wherein the filter means are a pair of superimposed generally cylindrical filters of which an uppermost filter has a greater porosity than a lowermost filter.

A further object of the present invention is to provide a novel wastewater treatment mechanism as aforesaid wherein unitizing means for the inner telescopic unit includes at least one threaded rod projecting from the cap through openings of baffle plates in the third settling zone which also pass through openings in a top wall of the inner container.

This innovative wastewater treatment mechanism also includes a novel method of indicating process failure. Should process failure occur in any of the filtration, settling or disinfection mechanisms within the device, whether caused by lack of service, extreme hydraulic or organic overload of the upstream wastewater treatment system, toxic upset or other situations beyond normal operation, an induced upstream head of water will develop. This head of water will increase (with continuing incoming flow) until liquid level rises to the elevation of a transfer port located in the wall separating upstream processes from downstream flow. The invert of this port is located at a level which corresponds to a respective alarm indication level as in the case of a foam restrictor of a home aeration system.

The lack of routine service, especially the lack of chlorine addition, will result in non-stabilized solids collecting in the chlorine contact chamber and the minute spacing between adjacent baffle plates will be closed by anaerobic biological action/growth within a short period of time. This lack of service will not compromise effluent quality, but instead will shut down the system causing the backup heretofore noted and an alarm indicative thereof.

Even in the event of partial system process failure by, for example, plugging of the primary, secondary and/or tertiary filters, the downstream process will continue functioning and accomplish chlorination, settling and solids removal through several process functions. Thus, even with a major process failure in the primary filtration, the present system will not pollute the environment or prematurely foul a separate downstream process (tile field or other).

With the above and other objects in view that will herein after appear, the nature of the invention will be more clearly understood by reference to the following detailed description, the appended claims and the several views illustrated in the accompanying drawings.

BRIEF DESCRIPTION OF THE DRAWINGS

FIG. 4 is a top plan view looking downwardly in FIG. 7, and illustrates a generally T-shaped channel having arms aligned with the flow equalization ports and a leg for delivering waste water past the dry tablet chlorinator and a generally Y-shaped channel for discharging effluent past the dry tablet dechlorinator.

FIG. 5 is a slightly reduced cross sectional view taken generally along line 5—5 of FIG. 7, and illustrates various ones of the solids settling chambers or zones, and particularly the baffled settling chamber and the effluent stilling chamber downstream thereof.

FIG. 6 is an enlarged fragmentary sectional view taken generally along line 6—6 of FIG. 5, and illustrates several baffle plates which are closely spaced and between which solids settle as effluent flows generally horizontally to the effluent stilling chamber.

FIG. 7 is an axial cross sectional view of the wastewater treatment mechanism, and illustrates the various components shown in FIG. 2 and the relationship of one set of the flow equalization ports to the underlying T-shaped channel.

FIG. 9 is a cross sectional view taken generally along line 9—9 of FIG. 7, and also illustrates the various cylindrical walls, filters, settling chambers and the dry tablet dechlorination tube.

FIG. 10 is an enlarged fragmentary longitudinal cross-sectional view of another wastewater treatment plant constructed in accordance with this invention, and illustrates an aeration chamber, a clarification chamber, and another novel wastewater treatment mechanism or filtering system housed in the clarification chamber.

FIG. 11 is an enlarged axial perspective view taken through the wastewater treatment mechanism of FIG. 10, and illustrates an inner unitized unit telescopically received in an outer unit and a plurality of filtering means, settling chambers, a baffle plate assembly in one of the settling chambers, a dry tablet chlorinator, and a dry tablet dechlorinator.

FIG. 12 is a cross-sectional view taken generally along line 12—12 of FIG. 16 and more clearly illustrates details of the unitized inner unit and the unitized outer unit together with flow lines indicating the direction of wastewater flow through the mechanism.

FIG. 13 is an enlarged cross-sectional view taken generally along line 13—13 of FIG. 12, and illustrates the manner in which the inner unitized unit is telescopically received in the outer unit, a top wall or cap of the inner unit, and a generally Y-shaped channel for directing wastewater flow from generally diametrically opposite points toward a point of merger and radially outwardly from the latter.

FIG. 14 is a fragmentary side elevational view of the top wall or cap of the inner unit, and illustrates tubes for the dry tablet chlorinator and dechlorinator, a handle, two of four levelling screws, and two of four threaded rods which unitize the top or cover to a container of the inner unit.

FIG. 15 is a cross-sectional view taken generally along line 15—15 of FIG. 14, and illustrates an opening in a lowermost wall of the cap through which wastewater exits the inner unit chamber and a wall for converging wastewater flow from the opening radially outwardly toward a discharge port.

FIG. 16 is a top plan view of the wastewater treatment mechanism, and illustrates a top wall or cap for the outer unit and a flange of the outer unit carrying movable locating and locking lugs.

FIG. 17 is a fragmentary side elevational view taken generally along line 17—17 of FIG. 13, and illustrates a flange connection between an outlet of the clarification chamber and the wastewater treatment mechanism.

DESCRIPTION OF THE PREFERRED EMBODIMENTS

Figure 1:
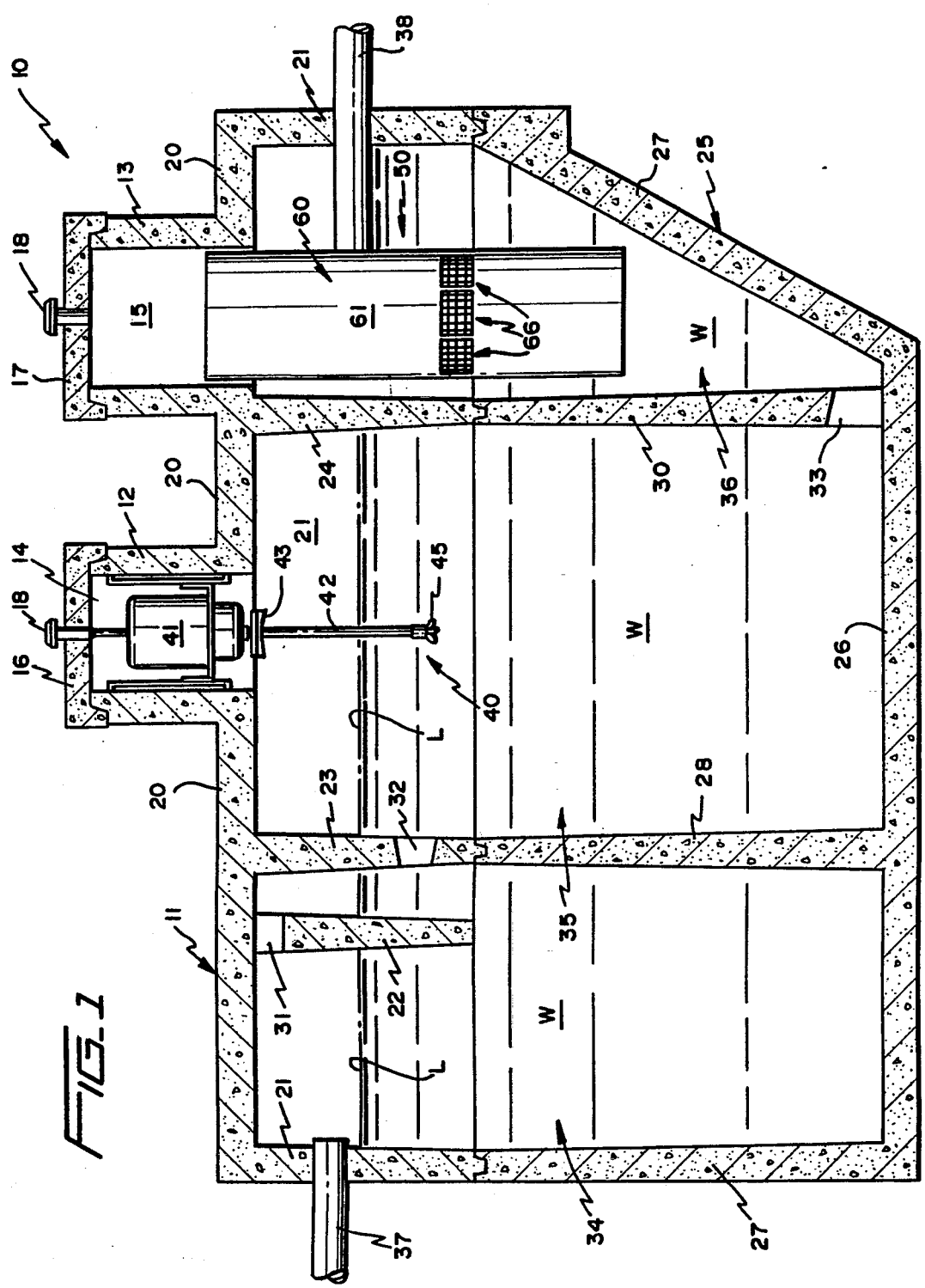
FIG. 1 is a longitudinal cross section view of a novel wastewater treatment plant constructed in accordance with this invention, and illustrates pretreatment, aeration and final clarification chambers, and particularly a novel wastewater treatment mechanism or filtering system housed in the clarification chamber.

The novel method and apparatus disclosed specifically hereinafter includes improvements in the wastewater treatment plant disclosed in U.S. Pat. Nos. 4,505,813 and 4,608,157 and in U.S. patent application Ser. No. 07/477,389 (now U.S. Pat. No. 5,207,896), each in the name of Jan D. Graves, and the totality of the disclosures of these patents are incorporated herein by reference.

In keeping with the present invention, the novel wastewater treatment plant is generally designated by the reference numeral 10 (FIG. 1) and is normally designed for use with individual homes, although the same is readily adapted to many other facilities, and is designed to utilize the well known digestion processes of wastewater or like fluid treatment.

The wastewater treatment plant 10 includes an upper concrete casting 11 having two cylindrical risers 12, 13 defining respective generally cylindrical chambers 14, 15 closed by respective covers 16, 17 each carrying an identical vent 18. The risers 12, 13 project upwardly from a top wall 20 which is bound by a peripheral wall 21. Three walls 22, 23 and 24 project downwardly from the top wall 20, and the walls 23, 24 span the distance between opposite sides (not shown) of the peripheral wall 21.

The wastewater treatment plant 10 also includes a lower casting 25 defined by a bottom wall 26, a peripheral wall 27 and walls 28, 30 upstanding from the bottom wall 26 and spanning the distance across opposite sides of the peripheral wall 27. The walls 22, 23 and 30 have respective openings 31-33. The castings 11, 25 are assembled on-edge and selective walls thereof define a pretreatment chamber 34, an aeration chamber 35 and a final clarification chamber 36. Incoming wastewater (organic flow and solids) is introduced into the pretreatment chamber through an inlet pipe 37 and, after complete treatment, effluent is discharged from the wastewater treatment plant 10 through a discharge pipe 38. The functions of the pretreatment chamber 34, the aeration chamber 35 and the clarification chamber 36 are described in the previously noted Graves patents, and suffice that for a complete understanding of this invention it need but be noted that the aeration chamber 35 includes means 40 for aerating wastewater water W in the aeration chamber 35. The aeration means 40 includes an electric motor 41 which rotates a tubular shaft 42 carrying a foam deflector 43 well above the normal level L of the wastewater W and a plurality of aeration nozzles or aspirator ports 45 from which bubbles exit to effect extended aeration in a conventional manner. Should the level L of the wastewater W rise such that the higher wastewater level or foam thereof reacts with the foam deflector or foam restrictor 43, the latter will be slowed in its rotation by the foam/high wastewater level, just as described in the earlier mentioned Graves patents. However, the position of the foam restrictor or aerator deflector 43 is also significant with respect to the construction of a novel wastewater treatment mechanism 50, as will be apparent more fully hereinafter.

The wastewater treatment mechanism 50 is suitably supported in the clarification chamber 36 by, for example, attachment of the outer cylindrical casing to the corresponding riser 13. However, this attachment is also constructed to allow the wastewater treatment mechanism 50 to be selectively vertically positioned at a predetermined location relative to the normal water level L of the wastewater W for reasons which will be described and made more apparent hereinafter.

The wastewater treatment mechanism 50 will now be described with particular reference to FIGS. 2, 3 and 7 and the dashed unnumbered headed arrows associated with the former and latter Figures which indicate the direction of wastewater/effluent flow into, through and out of the wastewater treatment mechanism 50.

Figure 3:
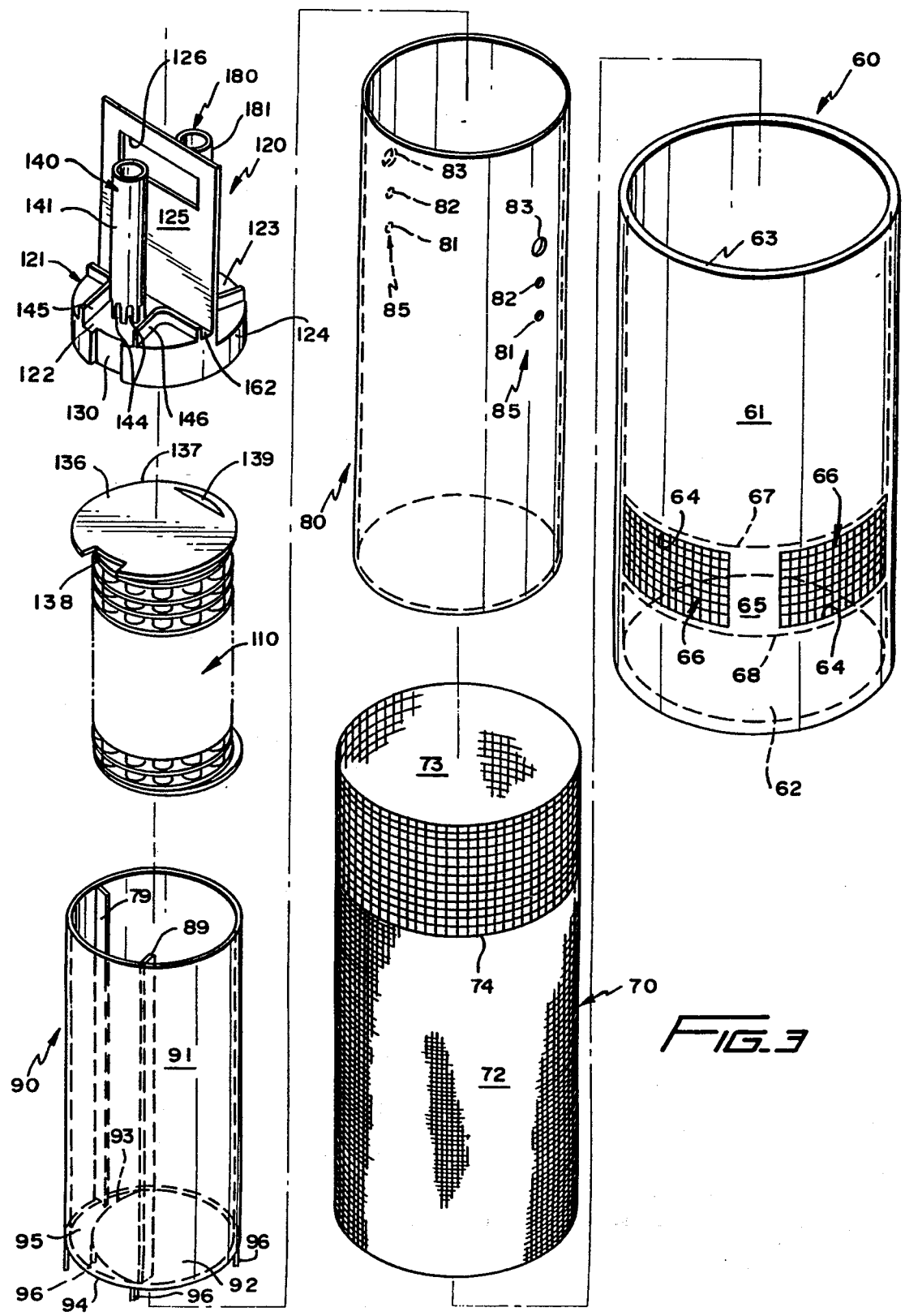
FIG. 3 is an exploded view of the wastewater treatment mechanism of FIG. 2, and illustrates the major components thereof including an outermost cylindrical housing carrying primary filters, a next innermost cylindrical wall defined by secondary and tertiary cylindrical filters, a next innermost cylindrical wall having a plurality of diametrically opposite pairs of flow equalization ports, and three remaining components which define a baffled solids settling chamber, an effluent stilling chamber, a final discharge/settling chamber, and the dry tablet chlorinator and dechlorinator.

The individual major components of the wastewater treatment mechanism 50 are illustrated in FIG. 3 and these include an outermost housing or container 60, a next innermost cylindrical filter means or filtering wall 70, a further innermost cylindrical or peripheral wall 80 and a final inner housing or container 90 which receives therein a baffle plate assembly 110 and which is closed by an upper closure assembly 120.

Upon the assembly of the components 60, 70, 80, 90, 110 and 120 to form the wastewater treatment mechanism 50, these various components set-off or define seven solids settling chambers or zones 100, 200, 300, 400, 500, 600 and 700. As the wastewater enters into and travels through the various solids settling zones or chambers, solids S (FIG. 7) are settled therefrom until stable high-quality effluent is eventually discharged from the wastewater treatment mechanism 50.

The outermost housing 60 (FIGS. 2, 3 and 7) includes a cylindrical wall 61, a circular integral bottom wall 62 and a top terminal free edge 63. A plurality of generally rectangular shaped openings 64 are formed in the cylindrical wall 61 with adjacent openings 64 being bridged by a wall portion 65. Filter means 66 defines a primary filter or baffle which is formed of non-biodegradable inert synthetic material (nylon) of relatively large mesh (5000 mc). The primary filter 66 is a sheet of nylon mesh material having an upper edge 67 and a lower edge 68 the distance between which is greater than the axial distance between the upper and lower edges (unnumbered) of the openings 64. The nylon mesh or filter 66 is conformed to a cylindrical shape corresponding to the exterior diameter of the cylindrical wall 61 and is suitably secured thereto. Thus, each opening 64, of which there are preferably four to twelve such openings, is covered by the primary filter 66 which functions to filter relatively large solids S1 as the wastewater W in the clarification chamber 36 flows into and through the opening 64, as indicated by the dashed unnumbered headed arrows associated therewith. These large solids S1 eventually fall to the bottom of the clarification chamber 36, as indicated by the solid unnumbered arrows associated therewith. Smaller solids Ss which hydraulically pass through the primary filters 66 and into the first solids settling chamber 100 begin to settle therein, as is indicated by the smaller solids Ss moving downwardly in the chamber 100 along the solid unnumbered arrows associated therewith. The solids accumulate upon the bottom wall 62 of the first settling chamber or zone 100.

The first solids settling chamber 100 is generally defined between the cylindrical wall 61 of the outermost housing 60 and the primary filter 66 thereof and the cylindrical filtering means 70, and above the portion of the bottom wall 62 therebetween.

The cylindrical filtering means or filtering wall 70 is formed of two cylindrical filters of different mesh, namely, a cylindrical secondary filtering means or filters 72 and a generally cylindrical tertiary filtering means or filter 73. Each of the secondary and tertiary filters 72, 73, respectively, are also formed of non-biodegradable inert synthetic material (nylon) having respective meshes of 1000 mc and 3360 mc. Accordingly, the primary filter 66 is the coarsest mesh., the tertiary filter 73 is the next coarsest mesh, and the secondary filter 72 is the finest mesh. The filters 72, 73 are joined to each other or abut along abutting edges 74 (FIG. 3), and during normal wastewater level L (FIG. 7) the abutting edges 74 are considerably above the water level L for a purpose and function to be described more fully hereinafter.

The second solids settling chamber or zone 200 is set-off between the cylindrical filtering means or cylindrical filter 70 and the next innermost or cylindrical wall 80 together with the portion of the bottom wall 62 of the outermost housing 60 set-off therebetween. As hydraulic head and flow of the wastewater displaces the wastewater W through the secondary filter 72, relatively minute solids Sm will pass through the mesh thereof and eventually settle out upon the bottom wall 62, as is best illustrated in FIG. 7. Accordingly, as thus far described, the wastewater treatment mechanism assures that relatively large solids and particulates S1 never enter the mechanism 50 because of the filter 66; those smaller particles Ss which pass through the filter 66 settle in the first settling chamber 100; and the minutest solids Sm which can pass through the finest mesh of the secondary filter 72 enter and settle in the second settling chamber or zone 200. At this point it should be particularly noted that the tertiary filter 73 is essentially inactive or inoperative so long as the wastewater level L is at or below the abutting edges 74 of the cylindrical filters 72, 73.

An important aspect of the present invention is the manner in which the wastewater exits the second settling chamber 200 and enters the third solids settling chamber or zone 300 which is defined between the cylindrical wall 80 and a cylindrical wall 91 of the inner housing 90 which includes a bottom wall 92 having an arcuate edge 93 spaced in part from a circular bottom edge 94 of the cylindrical wall 91 to define therewith a generally crescent-shaped slot or opening 95. A plurality of legs 96 four carried by the cylindrical wall 91 and projecting below the circular edge 94 and at least one carried by the bottom wall 92 support the housing 90 with the bottom wall 92 in elevated spaced relation ship to the bottom wall 62 of the outermost housing 60. The diameter of the cylindrical wall 91 is appreciably less than the diameter of the cylindrical wall 80 and thus the annular area between these two walls defines the third solids settling zone or chamber or unbaffled contact settling zone 300.

The hydraulic head of the wastewater is, as was heretofore noted, determined by the wastewater level L and, as thus far described, the rate of flow of the wastewater/effluent through the wastewater treatment mechanism 50 will depend upon the head or height of the wastewater within the clarification chamber 36, the rate of flow of the wastewater through the filters 66, 72, 73 the size of the solids or particulates involved during filtration, settling, etc. However, under "normal" hydraulic head, the level L of the wastewater W is generally at or below the level L, best illustrated in FIG. 7, which approximates the position of a lowermost diametrically opposite pair of flow equalization ports or openings 81 (FIG. 3) which control the rate of wastewater flow through the cylindrical wall 80 in response to the level of upstream wastewater. The diametrically opposite ports or openings 81 are approximately three-/one-half inches below another set of flow equalization ports 82 and the latter are in turn a like distance below another pair of larger flow equalization ports 83. The flow equalization ports 81–83 are collectively designated by the reference numeral 85, and as is most apparent in FIG. 3, these ports are not only aligned in diametrically opposite pairs, but the ports on opposite sides are generally in vertical alignment, though in keeping with this invention the orientation of the ports 81–83 can vary so long as they function to assure equalization of wastewater flow or demand rate flow. For example, as the wastewater level L rises in the clarification chamber 36 or any of the settling chambers 100 and 200, the wastewater level L will progressively flow slowly through the lower flow equalization ports 81 adjacent the invert of the equalization ports 81 and will progressively rise as the liquid level L rises and the hydraulic head proportionately increases. As the level L of the wastewater W rises, the pressure increase cause the flow of wastewater through the ports 81 to increase. However, once the level L of the wastewater W rises above the ports 81 but has not yet reached the ports 82, the difference in the flow of the wastewater W through the ports 81 will be a proportional increase dependent upon the pressure created during the progressive rise of the wastewater level L of the wastewater W as the level L rises between the ports 81, 82 and until such time as the level L reaches the ports 82 resulting in additional wastewater flow therethrough. Accordingly, during relatively high wastewater flow rates upstream of the flow equalization means or ports 85, the flow of the wastewater through the entire wastewater treatment mechanism 50, and for that matter the entire wastewater treatment plant 10, is controlled by the flow equalization means 85 and the progressive demand flow of the wastewater through the successive pairs of ports 81, 82 and 83. In this way, even under extremely high incoming rates of wastewater into the wastewater treatment plant 10 through the inlet pipe 37 (FIG. 1), the demand or equalized flow rate of the effluent discharged eventually outwardly of the wastewater treatment mechanism 50 and the discharge pipe 38 thereof (FIG. 1) assures stable high-quality effluent.

Under extremely high wastewater flow the level L can reach the larger pair of openings 83 which are significantly larger than the pairs of ports 81, 82 to assure that even under relatively extremely high wastewater flow an effective high-quality effluent will be created by the wastewater treatment mechanism 50 and discharged therefrom.

Reference is also particularly directed to FIG. 7 and the location of the inverts of the pair of flow equalization ports 83 relative to the location of the abutting edges 74 between the secondary cylindrical filter 72 and the tertiary cylindrical filter 73. The edges 74 lie in a generally horizontal plane which passes through the invert of the pair of equalization ports 83. Thus, until such time as the liquid level L rises to the level of the abutting edges 74 and the invert of the flow equalization ports 83, the tertiary filter 73 remains inoperative and all filtration as wastewater W flows from the first solids settling chamber 100 into the second solid settling chamber 200 occurs by filtration through the second cylindrical filter 72 which, as noted earlier, is the finest mesh of the filters 66, 72, 73. However, as the level L rises above the edges 74 and the invert of the flow equalization ports 83, the tertiary cylindrical filter 73 becomes effective and passes not only the minute solids Sm, but a range of particulates or solids Sr which passed through the filter 66 yet could not pass through the filter 72. Accordingly, at relatively high wastewater levels L at and above the abutting edges 74 and above the volute of the flow equalization ports 83, solids Sm and a range of solids Sr pass through the tertiary filter 73 and eventually settle into the second solids settling chamber or zone 200, as indicated in FIG. 7. Accordingly, even under the most extreme high levels L of wastewater W in the system, filtration continues within an acceptable range through the operation of the tertiary cylindrical filter 73.

Another important aspect of the present invention is the manner in which the wastewater exiting any or all of the pairs of flow equalization ports 81–83 is chlorinated prior to being discharged into the third settling zone 300 which will be further understood and described by reference to FIGS. 3–7 and 8.

The baffle plate assembly 110 includes approximately 37 identical baffle plates 111 each of which includes a generally arcuate edge 112, a chordal edge 113 and terminal ends or points 114, 115 at the intersection of the arcuate and chordal edges 112, 113, respectively. Each baffle plate 111 also includes a bottom wall 116 whose periphery is defined by the edges 112, 113 and the terminal ends 114, 115. A generally sinusoidal weir or wall 117 projects upwardly from each bottom wall 116 and between adjacent loops (unnumbered) of the sinusoidal wall 117 is located a generally tear-drop opening 118. Each baffle plate 111 includes three bosses 119 each of which includes a throughbore 131 (FIG. 6). The bosses 119 each project approximately 1/16" above the uppermost edge (unnumbered) of the sinusoidal weir or wall and thus adjacent stacked baffle plates 111 are spaced from each other approximately 1/16" to define a sinusoidal passage 132 between the lower surface (unnumbered) of each bottom wall and the upper edge (unnumbered) of each sinusoidal weir 117. Each bore 131 of each boss 119 is counterbored at 133 to receive a head 134 of a bolt 135 (FIG. 6) in the lowermost one of the baffle plates 111. An upper end (not shown) of each of the bolts 135 is threaded and is received in a threaded blind bore (not shown) in a top plate 136 (FIG. 3) which is unapertured and includes a generally arcuate edge 137, a chordal cut-out, slot or edge 138 and a chordal cut-out or opening 139. The baffle plate assembly 110 is inserted into the inner container 90 with the rails 79, 89 tightly bottoming the arcuate edge 112 of the baffle plates 111. The latter arrangement holds the terminal ends or points 114, 115 of each of the baffle plates 111 against the right-hand side (as viewed in FIG. 5) of the inner peripheral surface (unnumbered) of the cylindrical wall 91 of the inner housing 90 for a purpose to be described more fully hereinafter. However, it is to be particularly noted that the bottom wall 116 of the lowermost baffle plate 111 rests flush upon the bottom wall 92 with the arcuate edges 112 being all in coincident relationship to each other and to the arcuate edge 93 of the bottom wall 92. The latter relationship therefore imparts a generally vertically extending, crescent-shaped cross sectional configuration, as viewed in FIG. 5, to the fourth settling chamber 400. In other words, as viewed in FIG. 5, to the left of the terminal ends or points 114, 115 the arcuate edge 112 of the baffle plates 111 defines a generally interior boundary of the fourth settling chamber 400 while the interior surface of the cylindrical wall 91 to the left of the same terminal ends or points 114, 115 defines the outer boundary of the fourth settling chamber or zone 400.

Figure 2:
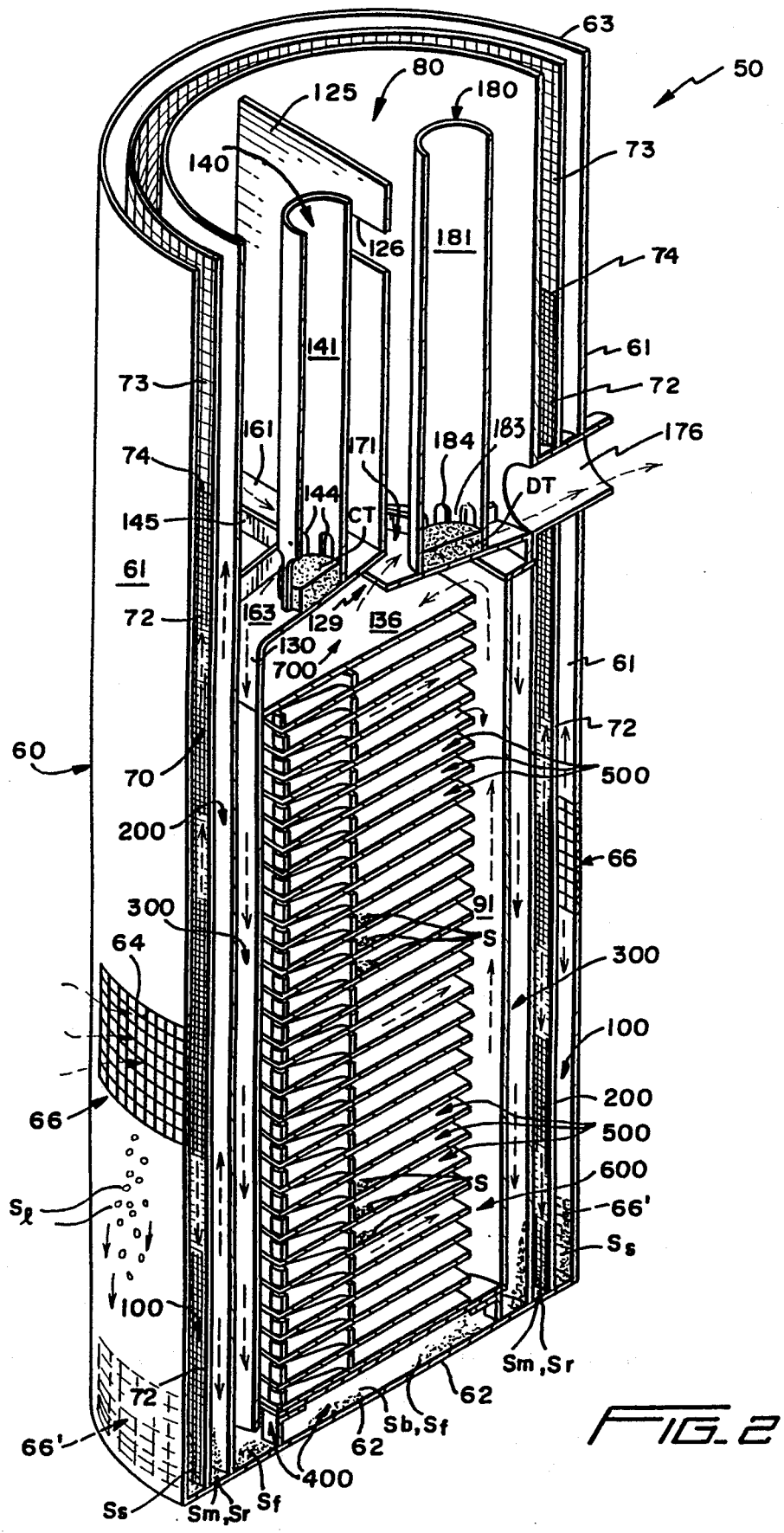
FIG. 2 is an enlarged axial perspective view taken through the wastewater treatment mechanism of FIG. 1, and illustrates a plurality of solids settling zones or chambers, primary, secondary and tertiary filtering means associated with selected ones of the settling chambers, a baffle plate assembly defining one of the settling chambers, a dry tablet chlorinator and a dry tablet dechlorinator.

The fifth settling zone or chamber 500 is defined by the upper surface (unnumbered) set-off between each sinusoidal weir 117 and its chordal edge 113 over, of course, the entire axial height of the baffle assembly 110 and the totality of the baffle plates 111 thereof, which approximately number 37 (though less are illustrated in FIG. 2 for simplification) and thus create essentially 37 of the horizontally disposed fifth settling chambers 500. Still further solids/particulates Sb, more specifically binder fibers of chlorination tablets, settle (FIG. 6) in the manner generally illustrated best in FIG. 6.

The sixth solids/particulates settling chamber or zone 600 which is essentially an effluent stilling chamber or zone, is set-off to the right of each chordal edge 113, as viewed in FIG. 5, and between the chordal edge 113 of each baffle plate 111 and the opposing interior surface (unnumbered) of the cylindrical wall 91. As will be described more fully hereinafter, the flow of the effluent of the fifth settling chamber or zone 500 is horizontal and to the right, as viewed in FIGS. 5 and 6, and subsequently enters the chordal contoured sixth settling zone 600 in which the hydraulic flow is upward (dashed unnumbered headed arrows) but further solids/particulates Sf settle downwardly (solid unnumbered headed arrows) and collect as indicated in FIG. 7 upon the bottom wall 92 of the inner housing 91.

Another important aspect of the invention is the manner in which the upper closure assembly 120 rests upon the top plate 136 of the baffle plate assembly 110 and directs wastewater exiting any of the pairs of flow equalization ports 81–83 into the third solids settling chamber 300 and creates in combination with the top plate 136 the seventh solids settling chamber 700 from which the effluent is eventually discharged.

The upper closure assembly 120 (FIG. 3) includes a cup-shaped or cap member 121 defined by two semi-circular top walls 122, 123 each merging witch a circular or peripheral wall 124 having an inwardly stepped notch 130. The top walls 122, 123 are spaced from a bottom wall or plate 136 having a peripherally located slot 138. A vertical wall 125 having a rectangular opening or slot 126 is disposed generally along a diametrical centerline of the cap member 121 and forms an integral upward extension of the semi-circular top wall 122. The semi-circular top walls 122, 123 have respective vertically offset and parallel edges 127, 128 (FIG. 7) defining there between a flow passage 129.

Figure 8:
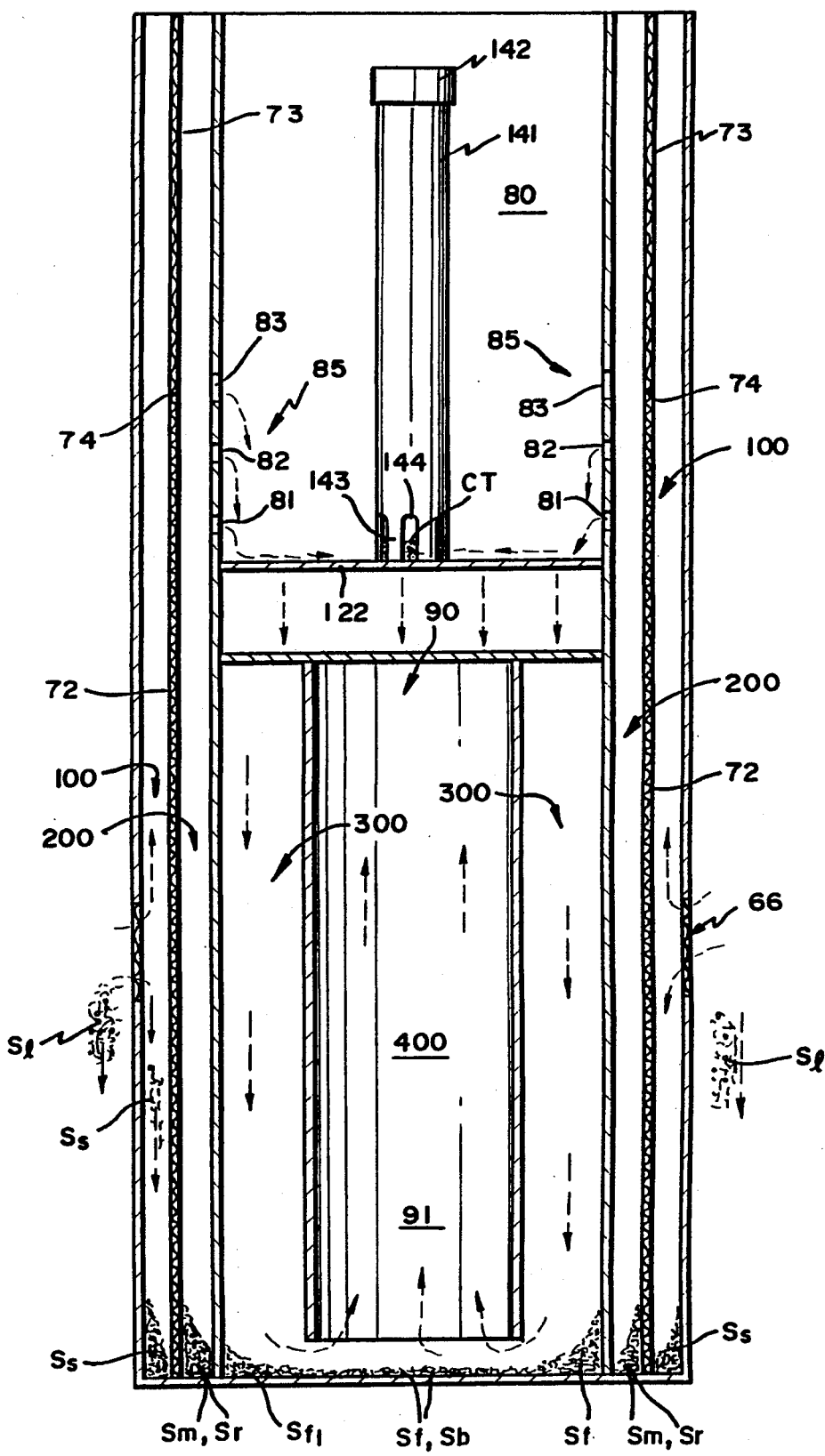
FIG. 8 is a cross sectional view taken generally along line 8—8 of FIG. 7, and illustrates further details of the various cylindrical walls, filters, settling chambers and dry tablet chlorinator.

Means for chlorinating the wastewater is generally designated by the reference numeral 140 and includes a dry tablet chlorinator tube 141 of a generally cylindrical configuration closed at its top by a conventional cap 142 and having at a lower end thereof a plurality of legs 143 between each pair of which is an opening or passage 144. The legs 143 rest upon the semi-circular top wall 122. The chlorination means or dry tablet chlorinator 140 is spaced from the vertical wall 125 (FIG. 7) and a pair of right-angle shaped ribs or walls 145, 146 which are in upstanding relationship to and are carried by the semi-circular wall 122. The walls 145, 146 and 125 define a generally T-shaped channel, particularly as viewed from above in FIG. 4, which is generally designated by the reference numeral 148. The T-shaped channel 148 is defined by a pair of generally parallel channel arms 161, 162 (FIG. 4) merging with a channel leg 163 at a channel bight portion or junction 164, and it is generally at the channel bight portion or juncture 164 that the chlorinator tube 140 is located. Furthermore, the channel arms 161, 162 are in vertical underlying alignment with the vertically aligned flow equalization ports 81–83 on diametrically opposite sides of the cylindrical wall 80. Thus, as wastewater W flows from any or all of the flow equalization ports 81–83, the wastewater W flows downwardly into the channel arms 161, 162 and continues toward the channel juncture 164. The vertical walls 145, 146 define means for directing the wastewater W along a generally radial flow path of limited peripheral extent in a generally radially outward direction, as is clearly indicated by the broken unnumbered arrows associated therewith in FIG. 4. The wastewater W then passes into the chlorinator tube 140 through the upstream side passages 144, flows through the chlorinator tube 140 through the downstream passages 144 thereof, and eventually discharges the T-shaped channel 148 through the channel leg 163. The wastewater W then flows generally downwardly through the stepped notch 130 of the cap member peripheral wall 124 and between the latter and the cylindrical wall 80 downwardly through the slot 138 of the bottom wall or plate 136 into the third settling chamber 300 and radially dispersed through the entire chamber, and eventually upwardly into the inner housing 90 through the crescent-shaped slot 95 thereof (See FIGS. 6 and 7) or any of the openings 118 in baffle plate 111. However, during the flow of the wastewater W through the chlorinator tube 140, as is best illustrated in FIGS. 7 and 8, the wastewater W is chlorinated by conventional dry chlorination tablets CT (only one of which is illustrated). The chlorination tablets CT are stacked full height of the chlorinator tube 140 and progressively dissolve in a conventional fashion and feed downward by gravity as the wastewater W passes through the chlorinator tube 140. Obviously, during the containment of the effluent in the third settling chamber 300 and the progressive hydraulic flow therethrough, still further solids and particulates settle out upon the bottom wall 62 and these solids settled in the third settling chamber are generally designated by the reference numeral Sf, although included therein are some of the binder fibers S6 of the chlorination tablets CT.

The fourth solids settling chamber or zone 400 is set-off by the area of the bottom wall 62 bounded by an imaginary downward projection of the cylindrical wall 91, and more specifically by a crescent-shaped area of the bottom wall 62 underlying the crescent-shaped slot or opening 95 of the inner housing 90. As is indicated in FIG. 7, hydraulic flow of the effluent is upwardly in the generally crescent-shaped volume of the fourth settling chamber or any of the openings 118 in baffle plate 111 but, of course, the solids or particulates settle by (drifting downwardly accumulating predominantly upon the crescent-shaped area latter-noted of the bottom wall 62 underlying the crescent-shaped slot 95 and under the openings 118. Though, of course, hydraulic currents tend to spread these solids/particulates generally across the entire central portion of the bottom wall 622. These solids are both the solids Sb and Sf, as indicated in FIG. 7.

As was heretofore noted, the effluent flows generally horizontally from left-to-right, as viewed in FIG. 7, through the fifth solids settling chamber 500 and will also, of course, flow vertically between adjacent baffle plates 111 through the various tear drop openings 118 thereof. However, the predominant flow of the effluent through the fifth settling chamber 500 is from left-to-right resulting in the settling of further solids and particulates, most specifically the non-biodegradable fibers Sb of the chlorination tablets CT, as was earlier described relative to FIG. 6.

The hydraulic flow of the effluent is upward in the sixth settling chamber or zone 600 which effectively is an effluent stilling chamber, and still further of the particles/solids Sf and Sb settle out and accumulate upon the bottom wall 92 of the inner housing 90, as is best illustrated in FIG. 7. Though settling of the solids Sf and Sb is downward in the sixth settling chamber 600, the hydraulic flow of the effluent is upward departing the settling chamber 600 through the chordal opening 139 of the top plate 136 of the baffle plate assembly 110.

The effluent flows from the chordal opening 139 into the seventh and final solids settling chamber or zone 700. Remaining extremely minute solids Sx settle upon the upper surface (unnumbered) of the plate 136 while the effluent eventually passes through the passage 129 from left-to-right, as viewed in FIG. 7, flowing upon an upper surface of the semi-circular top wall 23 along a general Y-shaped channel 171 thereof.

The Y-shaped channel 171 is defined generally between a pair of angular upstanding walls or rails 178, 179. The walls 178, 179 set-off opposite channel arms 172, 173, a channel juncture or bight 174 and a channel leg 175 which collectively define the Y-shaped channel 171. The channel leg 175 merges with an outlet pipe 176 (FIG. 7) which projects outwardly from and through the cylindrical wall 80, the cylindrical secondary filter 72 and the cylindrical wall 61 of the outermost housing 60. The vertical walls 178, 179 in the area of the channel leg 175 define means for directing the wastewater W along a generally radial flow path of limited peripheral extent in a generally radially outward direction, as is best visualized in FIG. 4. The outlet pipe 176 is connected to the discharge pipe 38 (FIG. 1) from which exits stable high-quality effluent.

In certain installations/environments it is desired or preferable to also dechlorinate the effluent prior to discharge thereof through the outlet pipe 176 (FIG. 7), and in order to do so the upper closure assembly 120 is also provided with means for dechlorinating the effluent which is generally designated by the reference numeral 180 which includes a dechlorination tube 181 closed at its upper end by a cap 182. A lower end of the dechlorination tube 181 includes a plurality of legs 183 resting upon the semi-circular wall 123 and defining therebetween openings or passages 184. A plurality of dechlorination tablets DT are stacked in the dechlorination tube 181 and, of course, as the effluent flows through the passages 184 and the dechlorination tube 181, the effluent is dechlorinated prior to discharge through the outlet pipe 176.

From the foregoing it is readily apparent that the wastewater treatment mechanism/filtering/settling mechanism 50 achieves all of the advantages and objectives earlier described through a highly novel construction resulting in an equally high degree of treatment. The highly efficient operation of the wastewater treatment mechanism 50 is initiated through the utilization of the high porosity primary filters 66, as was heretofore noted, to assure that relatively large solids Sl will not enter the wastewater treatment mechanism 50 and quickly deplete the solids storage capacity. Accordingly, only the smaller solids Ss pass through the primary filters 66, enter the first solids settling chamber 100 and settle to the bottom thereof. Furthermore, assuming normal level L of the wastewater W at the inverts of the lower flow equalization ports 81, the tertiary filter 73 remains inoperative because, as earlier noted, the level L lander normal flow rates is at or below the inverts of the highest and largest flow equalization ports 83. Accordingly, under normal flow of the wastewater through the wastewater treatment mechanism 50 under hydraulic head or pressure, as regulated by the flow equalization ports 81 through 83 heretofore described, the secondary filter 72 prevents the solids Ss from passing therethrough while allowing smaller particles Sm to pass therethrough and eventually settle within and upon the bottom wall of the settling chamber 200.

Obviously an important characteristic of the operation of the wastewater treatment mechanism 50 is the manner in which the tertiary filter 73 becomes active as the water level L rises above the abutting edges 74 and the invert of the uppermost equalization ports 83. As the wastewater in the system rises above the abutting edges 74 particles Sr which could not pass through the secondary filter 72 are now permitted to pass through the more porous tertiary filter 73 with, of course, whatever smaller particles Sm are above the abutting edges 74 and can as readily pass through the tertiary filter 73. Hence, under extreme demand conditions all three filters 66, 72 and 73 are operative and, of course, the remaining solids Sr which pass through the tertiary filter 73 also settle to the bottom of the second settling chamber 200, as described earlier herein.

Another advantage of the tertiary filter was noted earlier, but this involves the effect of changing liquid levels induced by the flow equalization ports 81-83. At levels above the abutting edges 74 and the equalization ports 83, solids accumulate upon the tertiary filter 73, but these solids will be exposed above the liquid level when the incoming flow stops and the system "rests." This accumulation of solids adhering to the tertiary filter 73 will advantageously dehydrate, experience a reduction in volume and will become biologically inactive. Therefore, upon a subsequent increase in the wastewater level L above the ports 83, the accumulated dehydrated sludge/solids will be "washed" from the tertiary filter 73 thus rendering it effectively self-cleaning and increasing the overall "life" of the mechanism 50.

It is also apparent that should wastewater flow become extremely excessive or process failure occur in any of the filtration, settling or disinfection mechanisms causing an induced upstream head of water to rise and reach the slot or opening 126 (FIGS. 7-9), such flow will pass through the slot 126 from the second chamber 200 into the Y-shaped channel 171, and exit.

As was noted earlier, the opening 126 is located also in the same general horizontal plane or the restrictor vane/foam detector/level sensing vane 43 (FIG. 1). Accordingly, when the wastewater level L reaches opening 126, it will also increase the torque on the motor 41 of the aerator 40 and automatically shut-down the system in the manner fully described in the previously noted patents. Thus, a separate shut-down system operative upon excessive wastewater level/height in the wastewater treatment mechanism 50 is totally unnecessary which obviously translates into less initial cost, and subsequent repair/maintenance.

The demand flow characteristic of the wastewater treatment mechanism 50 is also important from the standpoint of the operation of the next-in-line treatment of the wastewater by the chlorinating tablets CT in the chlorinating tube 141 (FIG. 7). Since the flow exiting the flow equalization ports 81-83, and particularly the flow equalization ports 81 and 82, is relatively moderate and uniform, only the bottommost of the chlorinator tablets CT will be partially or fully immersed in the wastewater flow as it passes through the passages 144 (FIG. 7). At the very worst the second or next uppermost chlorinator tablet CT (not shown) might be moistened somewhat by the wastewater. However, essentially the lowermost chlorination tablet CT will dissolve totally without the next uppermost chlorinator tablet CT becoming moist or sufficiently moist to expand and adhere to the chlorinator tube 141. Such adherence of the next uppermost or succeeding chlorinator tablets CT could prevent the tablets from descending in the tube 141 as the lowermost chlorinator tablet CT dissolves. This would most probably occur if there were few chlorinator tablets CT in the tube 141 and less likely to occur under conditions of a greater number of tablets and thus a greater weight. However, essentially by controlling the flow of the wastewater exiting the flow equalization ports 81-83 there is greater probability that only the lowermost chlorinator tablet CT will be moistened and dissolved and the next succeeding chlorination tablets will not be moistened or will not be moistened sufficiently to expand, adhere to the tube 141, and not drop downwardly upon the wall 122. If the tablets do not descend to the wall 122 chlorination would not take place. Hence, the flow equalization ports 81-83 not only function to assure proper upstream settling of the solids through all upstream and downstream processes, but also assure downstream chlorination in the absence of chlorinator tube blockage by the chlorinator tablets CT. Obviously the same advantages and objectives are realized in conjunction with the dechlorination mechanism or means 180.

In addition to the solids Sf and Sb which primarily settle out in the third settling chamber 300, some of the solids Sm, Sr which have not settled out the in the second chamber 200 will, of course, settle out in the third chamber 300. Thus, through the filtration and settling through the first, second and third settling chambers 100-300, respectively, virtually the minutest of solids or the binder of the chlorination tablets CT rises upwardly in the fourth settling chamber 400 and subsequently further settle vertically downward therein as well as passing through the passages 132 between the baffle plates 111 and settling in the fifth settling chamber 500, as best illustrated in FIG. 6 at Sb. Since only the very minutest of the solids are now in suspension, the passages 132 will not be blocked thereby or will not be blocked readily thereby, and the overall efficiency and the length of time between routine servicing is obviously increased.

Still further settling of solids Sf, Sb occurs in the sixth settling chamber 600 and final settling occurs in the seventh settling chamber 700 before subsequent discharge of the high quality effluent heretofore noted.

Although a preferred embodiment of the invention has been specifically illustrated and described herein, it is to be under stood that minor variations may be made in the apparatus and the method without departing from the spirit and scope of the invention as defined in the appended claims. For example, the filters 66 (FIG. 2) are shown spaced above the bottom wall 62 of the outermost housing 60 at a distance of approximately one-third of the overall housing height. However, in accordance with this invention, the filters 66 can be positioned elsewhere along the cylindrical wall 61 including immediately adjacent to and/or becoming part of the bottom wall 62, as illustrated in phantom outline by the filter 66' of FIG. 2. In this case the larger solids/particulates Sl will never enter the mechanism 50 while the smaller particles Ss will enter the first settling chamber 100. However, the solid/particulates Ss may not necessarily accumulate in the first settling chamber 100 and would tend to exit the first settling chamber 100 when wastewater flow/head ends. Thus, during typical cyclical wastewater flow, the smaller particulates Ss will pass through the filter 66' during waste water flow, enter the first settling zone or chamber 100, and would tend to exit the housing 60 back through the filter 66' when wastewater flow/head ends. Therefore, though there is little or no accumulation of the particulates Ss in the first settling zone 100 when the filter(s) 66' is positioned immediately adjacent to and/or becoming part of the bottom wall 62, the filter(s) 66' still performs its primary purpose, namely, preventing the larger particulate/solids Sl from entering the settling zone 100.

Another wastewater treatment plant constructed in accordance with this invention is generally designated by the reference numeral 210 (FIG. 10) and is normally designed for use with individual homes, septic tanks, or the like, but is subject to the same diverse usages as those described relative to the wastewater treatment plant 10 (FIG. 1).

The wastewater treatment plant 210 includes a concrete casting 211 having two cylindrical risers of which only a single riser 213 is illustrated. The riser 213 defines a generally cylindrical chamber 215 which is normally closed by a cover 217. The riser 213 projects upwardly from a top wall 220 which includes a flange 241 having a circular opening 240 and a radially inwardly opening slot 242 (FIG. 10). The riser 213 is bounded by a peripheral wall 221 which mates with a peripheral wall 227 which bounds and projects upwardly from a bottom wall 226 of a lower casting 225. One wall 224 which projects downwardly from the top wall 220 merges with another wall 230 projecting upwardly from the bottom wall 226 to define to the right thereof, as viewed in FIG. 10, a clarification chamber 236. An aeration chamber 235 and an upstream pretreatment chamber (not shown) precede the clarification chamber 236 and are identical to that illustrated in the wastewater treatment plant 10 of FIG. 1. Aeration means (not shown) are also housed in the aeration chamber 235 corresponding to the aeration means 40 of the wastewater treatment plant 10. Thus, wastewater flows through the wastewater treatment plant 210 from an inlet pipe (not shown) into and through the respective pretreatment and aeration chambers and eventually enters the clarification chamber through an opening 233 of the wall 230, in the manner heretofore described relative to the wastewater treatment plant 10. However, in lieu of the wastewater treatment mechanism 50 earlier described, the wastewater treatment plant 210 includes a wastewater treatment mechanism 250.

The wastewater treatment mechanism 250 will now be described with particular reference to FIGS. 10 through 17 of the drawings.

The wastewater treatment mechanism 250 includes two distinct units, namely, an outer unit 251 and in inner unit 351. These units are individually unitized structures in generally telescopic relationship to each other.

The outer unit 251 includes three major components, namely, filter means 252 in the form of a generally cylindrical filter wall or filter, an outer container 253, and a closure or top wall 254.

The outer container 253 is constructed from rotationally molded synthetic polymeric/copolymeric resinous plastic material and is defined by a bottom wall 255 of a generally circular configuration, as viewed from above or below, a peripheral wall 256, and a generally radially outwardly directed hollow peripheral flange 257 disposed between the bottom wall 255 and the peripheral wall 256. An upper end of the peripheral wall 256 terminates in a radially outwardly directed peripheral flange 258 which in turn includes an upwardly directed terminal lip 259. Four relatively short threaded stems 260 (FIG. 16) have lower ends (unnumbered) fixed to the flange 258 and upper ends (unnumbered) pass through openings (unnumbered) of four disc-shaped locating and locking lugs 261 (FIG. 16). A nut 262 is threaded upon each threaded stem 260 and retains each locking lug 261 assembled to the flange 258 for pivoting movement between a first position (not shown) in which the locking lugs 261 are all inboard of the terminal lip 259 and a second position in which each of the locking lugs 261 projects beyond the terminal lip 259, as is best illustrated in FIGS. 10, 11 and 16. In the latter position, the locking lugs 261 lie beneath the riser 213 (FIG. 10) and the entire mechanism 250 cannot be moved upwardly upon the removal of the riser cover 217 unless, of course, the locking lugs 261 are rotated by a suitable tool (not shown) to their retracted position inboard of the lip 259. The locking lugs 261 can move between the two positions just described inboard and outboard of the lip 259 because of the eccentric location of each threaded stem 260 offset from the axis (unnumbered) of each associated locking lug 261.

The peripheral wall 256 of the outer container 253 includes four radially inwardly directed projections 263 (FIGS. 11 through 13) which underlie a portion of the inner unit 351 and support the same in suspended telescopic relationship within the outer unit 251, as will be described more fully hereinafter.

The peripheral wall 256 of the outer unit 251 also includes a plurality of radially outwardly directed, vertically and circumferentially spaced filter spacing and supporting ribs 264 (FIGS. 11 through 13) which hold the filter means or filter wall 252 in substantially spaced relationship to the peripheral wall 256 and define therebetween a settling chamber 265 having a bottom defined by the hollow flange 257 (FIG. 12). As wastewater passes from the exterior of the filter 252 into the settling chamber 265, relatively large solids Sl in the wastewater cannot pass through the filter, whereas smaller particles Ss will pass through the filter 252 and will settle within the settling chamber or zone 265 upon the flange 257, as is best illustrated in FIG. 12.

Flow of the wastewater through the filter 252 and the settling chamber 265 is controlled much as in the case of the mechanism 50, namely, through the utilization of two diametrically opposite pairs 266 of flow equalization ports 267, 268 and 269 formed in the peripheral wall 256 of the outer unit 251. The equalization ports 267, 268 are of the same size and are smaller than the flow equalization port 269 (FIG. 12) of each pair 266 of flow equalization ports. The ports 267 through 269 function to assure equalization of wastewater flow or demand rate flow in the manner heretofore described relative to the ports 81 through 83 of the wastewater mechanism 50 (FIG. 7).

The cylindrical filter 252 is formed of two cylindrical filters of different mesh, namely, a primary lower filter 270 (FIG. 12) and a cylindrical upper secondary filter 271 having opposing edges 273 generally in abutment, much as the secondary and tertiary filters 72, 73 of the filtering wall 70 of the wastewater treatment mechanism 50. Each of the filters 270, 271 is constructed from nonbiodegradable inert synthetic material (nylon) of different meshes or porosities witch the secondary filter 271 having a greater porosity than the lesser porosity of the primary filter 270. Accordingly, while the large solids Sl may not pass through the filter 270, as might not mid-size solids Sm, some such mid-size solids Sm may pass through the coarser mesh of the secondary filter 271, as indicated in FIG. 12, .and also settle in the settling chamber 265 along with the smaller solids Ss. The latter occurs when, of course, the level of the wastewater in the clarification chamber 236 reaches a level above the level of abutment edges 273 of filters 270 and 271.

Means generally designated by the reference numeral 275 in the form of plastic clamping bands clampingly secure upper and lower edges (unnumbered) of the filters 270, 271, as well as the abutment edges 273, to the peripheral wall 256 of the outer container 253. In the latter fashion, the ,outer unit 251 constitutes essentially a unitized structure or unit.

The peripheral wall 256 also includes a circular opening 276 which is concentric with a circular opening 277 formed in the primary filter 270 (FIGS. 11 and. 12). An annular sealing gasket 278 has an outwardly opening peripheral groove (unnumbered) which receives the edges (unnumbered) defining the openings 276, 277.

The closure 254 of the outer unit 251 includes a generally circular end or top wall 280 of a generally circular configuration having four openings 281 (FIG. 16) which are aligned with and receive the threaded stems 260. A pair of tubular portions 282, 283 (FIGS. 11 and 16) project upwardly from the top wall 280 of the closure 254 and are in turn spanned by a tubular cylindrical handle 284. The tubular portions 282, 283 receive respective dechlorination and chlorination tubes 285, 286 having respective lower slots 288, 289 along with associated dechlorination and chlorination tablets (unnumbered).

The inner unit 351 is formed of three essentially major components, namely, an inner container 352, a closure or top wall 353, and a plurality of generally identical deck plates, baffle plates or baffle chamber plates 354. The inner container 352 is formed from rotationally molded synthetic polymeric/copolymeric material, and includes a generally cylindrical peripheral wall 355 terminating at a top wall 356 (FIGS. 11, 12 and 16) have a crescent-shaped opening 357. The generally cylindrical configuration of the peripheral wall 355 is interrupted generally diametrically opposite from the crescent-shaped opening 357 by two vertically extending ribs 358 (FIG. 16) which are each received in a radially outwardly directed notch 360 of each of the baffle plates 354. The latter inter-engagement between the notches 360 and the ribs 358 accurately locate the stack of baffle plates 354 within the interior chamber (unnumbered)of the inner container 352. Each of the baffle plates 354 and the top wall 356 has four openings 361 formed therethrough for receiving in each a relatively long threaded rod 362 with each threaded rod 362 having a wing nut 363 (FIG. 12) secured thereto beneath the lowermost one of the baffle plates 354. The threaded rods 362 are carried by the closure 353 (FIG. 14) and descend downwardly therefrom through the associated openings 361 in the top wall. 356 and each of the baffle plates 354. When the wing nuts 363 are tightened upon each of the threaded rods 362, the stack of baffle plates 354 are drawn against each other and are essentially clamped between the top wall 356 and the lowermost baffle plate 354, as is best illustrated in FIG. 12. The same tightening of the wing nuts 363 presses the top wall 356 against and in clamping relationship to an underside (unnumbered) of the closure 353. In this fashion the threaded rods 362 hold the inner container 352, the closure 353 and the baffle plates 354 together as a unitized structure or unit 351.

The closure 353 is of a generally hollow construction and includes a top wall 365 spaced from a bottom wall 366 and defining therebetween a chamber 367 (FIGS. 11 and 12). The walls 365, 366 are interconnected by a hollow depending peripheral flange 368 (FIG. 11). A circular opening 370 (FIGS. 11 and 15) is formed in an outer wall (unnumbered) of the hollow flange 368 and carries a sealing gasket 371 which is aligned with the sealing gasket 278 (FIGS. 12 and 13) of the outer unit 251 when-the units are assembled relative to each other, as is best shown in FIGS. 11 and 12 of the drawings.

The bottom wall 366 of the closure 353 includes an elongated port or opening 379 (FIG. 15) which is essentially bounded by an upwardly directed flow-control rib or projection 372 defined by a bight rib portion 373 merging with a pair of converging arm rib portions 374, 375 which in turn merge with terminal rib portions 376, 377. A circular depression or recess 378 is formed between the terminal rib portions 376, 377 (FIGS. 11 and 15) and functions to locate a lower slotted end portion (unnumbered) of the dechlorination feed tube 285. The recess 378 is axially aligned with a tubular portion 382 of the top wall 365 which is in axial alignment with the tubular portion 282 of the outer unit closure 254, as is best illustrated in FIGS. 11 and 12 of the drawings.

The closure 353 includes a generally upwardly opening Y-shaped trough 383 (FIG. 13) defined by trough arms 384,385 and a trough leg 386. The trough arms 384, 385 have end portions (unnumbered) remote from the axis of the closure 353 in generally underlying relationship to the pairs 266 of flow equalization/demand ports 267 through 269. Accordingly, any wastewater passing from the settling chamber 265 through any of the ports 267 through 269 will flow downwardly into the trough arms 384, 385 and merge prior to exiting the trough 383 through the trough leg 386 and from the latter downwardly through a radially outwardly opening gap or slot 387 (FIGS. 12 and 13) of the closure flange 368. The trough 383 defines means for directing the wastewater W along a generally :radial flow path of limited peripheral extent in a generally radially outward direction, as is best visualized in FIG. 13. The wastewater is, of course, subject to chlorination as it flows through the slots 289 of the chlorination tube 286 prior to flowing downwardly through the slot 387 and ,entering another settling chamber 390 defined between the peripheral walls 256, 355 of the outer and inner units 251, 351, respectively, and the bottom wall 255 of the outer unit 251 (FIGS. 11 and 12).

As is best illustrated in FIGS. 13 and 14, two strap handles 391 made of flexible plastic material are secured to the closure 353 by the long threaded rods 362.. This is done by threading the threaded rods 362 through circular openings (not shown) in the strap handles 391 prior to passing the threaded rods 362 through openings (not shown) in the closure 353 and the openings or holes 361 heretofore described relative to the baffle plates 354 and the top wall 356 of the inner container 352.

The closure 353 also carries a bubble level 392 (FIGS. 12 and 13) for the purpose of levelling the entire inner unit 351. Levelling is effected by selectively threading or unthreading four threaded bolts 393 which are threaded into threads (not shown) of the closure 353. The bolts 393 have terminal ends 394 which are each in alignment with and can abut vertically downwardly against an associated one of the radially inwardly directed projections 263 of the outer unit peripheral wall 256 (FIG. 11). Thus, as any one or selected ones of the levelling bolts 393 are rotated clockwise or counterclockwise, the end portions 394 thereof resting upon the projections 263 simply allow the closure 353 to be essentially "threaded" upwardly or downwardly in a selected fashion to effect levelling of the entire inner unit 351.

In order to assemble the wastewater treatment mechanism 250 within the wastewater treatment plant 210, the latter is first provided with one part of a two part sliding flange coupler 450 (FIGS. 10, 12, 13 and 17). The sliding flange coupler 450 includes a first flange coupler 451 formed of synthetic polymeric/copolymeric resinous material and a second flange coupler 452 made of rubber.

The first flange coupler 451 includes a tubular discharge pipe 453 which telescopically receives an effluent discharge line 454 sealed to each other by grout or a synthetic seal 455 (FIG. 10). The tubular discharge pipe 453 is provided with a receiving flange 456 (FIGS. 13 and 17) which includes a bight wall 457 (FIGS. 10 and 13), adjacent generally parallel side walls 458, 459 (FIG. 13), and respective opposing flanges 460, 461 defining therebetween an upwardly opening slot or groove 462.

The second flange coupler 452 includes a flange 470 which is sized to slide in the receiving flange 456 and a tubular portion 471 projecting from the flange 470 and having an exterior circumference corresponding to the interior openings (unnumbered) of the sealing gaskets 278, 371 (FIG. 12) to thereby effect a fluid-tight seal in the manner clearly evident from FIG. 12.

It is to be understood that the first flange coupler 451 is added to the concrete casting 211 after the latter has been formed and is held in the position shown in FIG. 10 by concrete 480 poured thereabout which subsequently sets and solidifies. The second flange coupler 452 is not, of course, assembled with the first flange coupler 451 when the latter is being joined to the upper body or casting 211 by the concrete 480.

The wastewater treatment mechanism 250 is assembled within the clarification chamber 236 of the wastewater treatment plant 210 by simply lowering the same through the riser 213 with, of course, the riser cover 217 removed and the lugs 261 inboard of the lip 259 (position not illustrated). The tubular portion 471 of the flange coupler 452 is also fully seated within the sealing gaskets 278, 371. As the wastewater treatment mechanism 250 is lowered into the riser 213, it passes through the circular opening 240 of the flange 241 which, as noted earlier, also includes the inwardly opened slot 242 which opens into the opening 240. The slot 242 has a width, as viewed from above, generally corresponding to the distance between the side walls 458, 459 of the flange coupler 451 (FIG. 13). Accordingly, as the wastewater treatment mechanism 250 is progressively lowered, it passes through the opening 240 and the rubber flange 470 passes through the slot 242 and enters the receiving flange 456 sliding down the same until reaching the position shown in FIGS. 10, 12 and 17. During this same downward sliding motion, the tubular portion 471 also slides downwardly between the flanges 460, 461 within the groove 462 defined therebetween. When the rubber sealing flange 470 is fully seated (FIG. 10), the peripheral flange 258 of the outer unit 251 rests upon and is supported by the flange 241 (FIG. 10). Each of the locking lugs 261 can then be rotated by an appropriate tool (not shown) outwardly beyond the terminal lip 259 and in underlying relationship to the bottom face (unnumbered) of the riser 213 thereby preventing upward removal of the wastewater treatment mechanism 250. The latter procedure is followed without, of course, the closure 254 and the tubes 285, 286 being assembled to the units 251, 351. In other words, only the inner unit 351 assembled in internal telescopic relationship to the outer unit 251 are collectively installed within the clarification chamber 236 as heretofore described.

Once the latter installation has been completed, the bubble level 392 is checked and the levelling bolts 393 are appropriately rotated so that the trough or flow deck 383 of the closure or top wall 353 is horizontal. The closure 254 is then assembled by slipping the openings 281 thereof (FIG. 16) over the threaded stems 260 of the locking lugs 261. Once the latter is accomplished, the tubes 285, 286 are readily slipped into the respective tubular portions 282, 382 and 283 along with appropriate respective dechlorination and chlorination tablets.

The operation of the wastewater treatment plant 210 is similar to that heretofore described with respect to the wastewater treatment plant 10, namely, wastewater at levels at or below the opposing edges 273 of the filters 270, 271 flows through the primary filter 270 resulting in the larger solids Sl setting exteriorly of the outer unit 251 to the bottom of the clarification chamber 236 (FIG. 10) while smaller solids Ss pass through the primary filter 270 and settle in the first settling chamber 265.

Under normal flow conditions, the wastewater in the first settling chamber 265 subsequently flows radially inwardly through the diametrically opposite lowermost equalization ports 267 and downnwardly upon the trough arms 384, 385 (FIG. 13) of the trough or flow deck 383 subsequent merging and flowing through the lower slots 289 of the chlorination tube 286 resulting in chlorination of the wastewater incident to its flow beyond the trough leg 386 and downwardly through the gap or slot 387 (FIGS. 11 and 13) into the second settling chamber 390 in which further solids Sf (FIGS. 11 and 12) settle upon the bottom wall 255.

The wastewater subsequently flows upwardly in and through the baffle plates or chlorine contact chamber 354 and subsequently exits the latter through the crescent-shaped slot 357. The wastewater then flows upwardly and outwardly through the opening 379 (FIG.

12 and 15) and converges to the left, as viewed in FIG. 15, as it flows through the slots 288 of the dechlorination tube 285 and subsequently exits the wastewater mechanism 250 through the tubular portion 471, the discharge pipe 453 and the effluent discharge line 454 (FIG. 10).

During peak flow of the wastewater should the level thereof pass beyond the abutting/opposing edges 273 of the filters 270, 271, the wastewater will flow through the larger mesh of the filter 271, passing therethrough the solids Sm heretofore described which are, of course, smaller than the solids Sl, but larger than the solids Ss. These solids Sm also settle in the various settling chambers as they flow through the mechanism 250. It should be particularly noted that the abutting/opposing edges 273 of the filters 270, 271 are above the ports 269, 269 (FIG. 12). This is to be distinguished from the location of the abutting edges 74 (FIG. 7) relative to the orifices 83 (FIG. 7) of the wastewater treatment mechanism 50. In the latter case, during peak flow, if liquid came through the peak flow orifices 83, it would additionally come through the coarsest mesh or peak flow mesh of the filter 73 at the same time. However, as is evident from FIG. 12, the coarsest mesh or peak flow mesh of the filter 271 has been essentially "raised" so that it no longer is on the same plane as the invert of the peak flow orifices 269. In this manner, the secondary or finer filter mesh of the filter 270 can be in use even though the hydraulic characteristics of the flow have caused the liquid level to rise to the peak flow orifices 269. The only time the coarser mesh of the filter 271 would enter into the process stream is when plugging of the finer mesh occurs or an extreme hydraulic surcharge of lengthy duration occurs that would cause it to back-up even higher than the peak flow orifice.

It should also be noted that the opening 126 of the wastewater mechanism 50 has been eliminated in the wastewater mechanism 250. The opening 126 (FIG. 7) in the baffle wall 125 causes liquid to rise to a failure indicator level should any process failure occur. The opening 126 also allows untreated wastewater then to flow through the opening 126 rather than back-up into an individual home. The latter is a by-pass which has caused concern, and thus the present treatment mechanism 250 excludes such a by-pass opening which would allow untreated liquid to go from the inlet of the unit directly to the outlet thereof without processing through the system. Thus, in the wastewater treatment unit 250, even if wastewater came in the top of the unit, its only flow path would be through the chlorination outlet, the various contact chambers, the deck plates, the outlet weir, and outwardly of the system to be treated/processed thereby. The same is true even with the dechlorination feed tube 180 in place, because the latter effectively seals off the same closure.

Although a preferred embodiment of the invention has been specifically illustrated and described herein, it is to be understood that minor variations may be made in the apparatus without departing from the spirit and scope of the invention, as defined the appended claims.

What is claimed is:

1. A closure for an inner unit of a wastewater treatment mechanism comprising a cap member having a chamber defined by a top wall, a bottom wall and a peripheral wall therebetween; a first opening for introducing wastewater into said chamber, a second opening for discharging wastewater from said chamber, means defined by said top wall for directing wastewater along an upper surface thereof along a generally radial flow path of limited peripheral extent in a generally radially outward direction, and said wastewater directing means initially directs wastewater from generally opposite points to a point of merger prior to affecting said radially outward direction.

2. The closure as defined in claim 1 including a third opening in said top wall for introducing a wastewater treatment medium into said chamber.

3. The closure as defined in claim 2 wherein said first opening is in said bottom wall.

4. The closure as defined in claim 2 wherein said second opening is located in said peripheral wall.

5. The closure as defined in claim 2 wherein said first opening is located in said bottom wall, and said second opening is located in said peripheral wall.

6. The closure as defined in claim 1 including means defined by said top wall for locating thereat means for introducing a wastewater treatment medium upon said top wall upper surface.

7. The closure as defined in claim 1 including means defined by said bottom wall for converging the flow of wastewater during the flow thereof from said first opening to said second opening.

8. The closure as defined in claim 1 including at least one threaded rod means projecting in a direction away from said bottom wall for securing said closure to a container of an outer unit of a wastewater treatment mechanism.

9. The closure as defined in claim 1 including means for leveling said closure upon installation thereof relative to an outer unit of a wastewater treatment mechanism.

10. The closure as defined in claim 1 wherein said first opening is in said bottom wall.

11. The closure as defined in claim 1 wherein said second opening is located in said peripheral wall.

12. The closure as defined in claim 1 wherein said first opening is located in said bottom wall, and said second opening is located in said peripheral wall.

13. The closure as defined in claim 1 wherein said generally opposite points are generally diametrically opposite each other and said point of merger is located between said generally diametrically opposite points.

14. The closure as defined in claim 13 wherein said first opening is in said bottom wall.

15. The closure as defined in claim 13 wherein said second opening is located in said peripheral wall.

16. The closure as defined in claim 13 wherein said first opening is located in said bottom wall, and said second opening is located in said peripheral wall.

17. A closure for an inner unit of the wastewater treatment mechanism comprising a cap member having a chamber defined by a top wall, a bottom wall and a peripheral wall therebetween; a first opening for introducing wastewater into said chamber, a second opening for discharging wastewater from said chamber, means defined by said top wall for directing wastewater along an upper surface thereof along a generally first radial flow path of limited peripheral extent in a generally radially outward direction, and means defined by said top wall for directing wastewater along an upper surface thereof along a generally second radial flow path of limited peripheral extent in a generally radially inward direction and into merger with said first radial flow path.

18. The closure as defined in claim 17 including means defined by said top wall for directing wastewater along an upper surface thereof along a generally third radial flow path of limited peripheral extent in a generally radially inward direction into merging relationship with said first and second radial flow paths.

19. The closure as defined in claim 18 wherein said first radial flow path has an outlet and said second and third radial flow paths each have an inlet and said outlet and inlets are in peripheral spaced relationship to each other.

20. The closure as defined in claim 18 wherein said first opening is in said bottom wall.

21. The closure as defined in claim 18 wherein said second opening is located in said peripheral wall.

22. The closure as defined in claim 18 wherein said first opening is located in said bottom wall, and said second opening is located in said peripheral wall.

23. The closure as defined in claim 17 wherein said first and second radial flow paths have respective outlets and inlets in peripheral spaced relationship to each other.

24. The closure as defined in claim 22 wherein said first opening is in said bottom wall.

25. The closure as defined in claim 23 wherein said second opening is located in said peripheral wall.

26. The closure as defined in claim 25 wherein said first opening is located in said bottom wall, and said second opening is located in said peripheral wall.

* * * * *